(12) United States Patent
Ebenezer

(10) Patent No.: US 10,885,907 B2
(45) Date of Patent: Jan. 5, 2021

(54) NOISE REDUCTION SYSTEM AND METHOD FOR AUDIO DEVICE WITH MULTIPLE MICROPHONES

(71) Applicant: Cirrus Logic International Semiconductor Ltd., Edinburgh (GB)

(72) Inventor: Samuel P. Ebenezer, Tempe, AZ (US)

(73) Assignee: Cirrus Logic, Inc., Austin, TX (US)

( * ) Notice: Subject to any disclaimer, the term of this patent is extended or adjusted under 35 U.S.C. 154(b) by 176 days.

(21) Appl. No.: 16/275,580

(22) Filed: Feb. 14, 2019

(65) Prior Publication Data

US 2019/0259381 A1 Aug. 22, 2019

Related U.S. Application Data

(60) Provisional application No. 62/630,358, filed on Feb. 14, 2018.

(51) Int. Cl.
*G10L 15/00* (2013.01)
*G10L 15/20* (2006.01)
(Continued)

(52) U.S. Cl.
CPC .............. *G10L 15/20* (2013.01); *G10L 15/22* (2013.01); *G10L 21/0232* (2013.01);
(Continued)

(58) Field of Classification Search
None
See application file for complete search history.

(56) References Cited

U.S. PATENT DOCUMENTS 7,492,889 B2   2/2009 Ebenezer
8,565,446 B1  10/2013 Ebenezer
(Continued)

OTHER PUBLICATIONS

M. Souden, S. Araki, K. Kinoshita, T. Nakatani and H. Sawada, "A Multichannel MMSE-Based Framework for Speech Source Separation and Noise Reduction," in IEEE Transactions on Audio, Speech, and Language Processing, vol. 21, no. 9, pp. 1913-1928, Sep. 2013, doi: 10.1109/TASL.2013.2263137. (Year: 2013).*

(Continued)

*Primary Examiner* — Edgar X Guerra-Erazo
(74) *Attorney, Agent, or Firm* — E. Alan Davis; James W. Huffman

(57) ABSTRACT

An audio device has an array of microphones and a voice processing system that obtains a multi-dimensional spatial feature vector comprising at least a correlation of the microphones and a calculation of at least one ratio of energies of the microphones, uses the multi-dimensional feature vector to estimate an energy of near-field speech and background noise, uses a ratio of the near-field speech energy and background noise estimates to estimate a probability of a presence of the near-field speech, adaptively combines signals from the microphones based on the estimated near-field speech presence probability to provide a combined output signal comprising a near-field speech signal and a residual background noise signal, estimates a power spectral density of the residual background noise signal present at the combined output signal using the estimated near-field speech presence probability, and reduces the background noise by using the estimated power spectral density.

31 Claims, 19 Drawing Sheets

(51) Int. Cl.
    *G10L 25/84*     (2013.01)
    *G10L 21/0232*     (2013.01)
    *G10L 25/21*     (2013.01)
    *H04R 1/40*     (2006.01)
    *H04R 3/00*     (2006.01)
    *G10L 15/22*     (2006.01)
    *G10L 21/0216*     (2013.01)

(52) U.S. Cl.
    CPC .............. *G10L 25/21* (2013.01); *G10L 25/84* (2013.01); *H04R 1/406* (2013.01); *H04R 3/005* (2013.01); *G10L 2021/02161* (2013.01); *G10L 2021/02166* (2013.01)

(56) References Cited

U.S. PATENT DOCUMENTS

| | | | | |
|---|---|---|---|---|
| 9,264,804 | B2* | 2/2016 | Åhgren | H04R 3/00 |
| 9,607,603 | B1 | 3/2017 | Ebenezer | |
| 9,838,783 | B2 | 12/2017 | Ebenezer | |
| 1,001,558 | A1 | 7/2018 | Ebenezer | |
| 2002/0193130 | A1* | 12/2002 | Yang | H04R 3/005 |
| | | | | 455/501 |
| 2007/0154031 | A1* | 7/2007 | Avendano | G10L 21/0208 |
| | | | | 381/92 |
| 2009/0012783 | A1* | 1/2009 | Klein | G10L 21/0208 |
| | | | | 704/226 |
| 2010/0081487 | A1* | 4/2010 | Chen | H04M 9/082 |
| | | | | 455/575.1 |
| 2010/0217590 | A1* | 8/2010 | Nemer | G01S 3/8006 |
| | | | | 704/233 |
| 2011/0096915 | A1* | 4/2011 | Nemer | H04M 3/568 |
| | | | | 379/158 |
| 2011/0264447 | A1* | 10/2011 | Visser | G10L 25/78 |
| | | | | 704/208 |
| 2013/0272540 | A1* | 10/2013 | hgren | H04R 3/00 |
| | | | | 381/94.1 |
| 2018/0330745 | A1 | 11/2018 | Ebenezer et al. | |

OTHER PUBLICATIONS

Byrne, Denis et al. "An International Comparison of Long-Term Average Speech Spectra." The Journal of the Acoustical Society of America, vol. 96 (4), Oct. 1994 pp. 2108-2120.

Nelke, Christoph et al. "Wind Noise Detection: Signal Processing Concepts for Speech Communication." 42nd Annual Conference on Acoustics, Aachen, Germany. DAGA 2016 Aachen. pp. 1-4.

Lim, Jae S. et al. "Enhancement and Bandwidth Compression of Noisy Speech." Proceedings of the IEEE, vol. 67, No. 12, Dec. 1979. pp. 1586-1604.

Martin, Rainer. "Spectral Subtraction Based on Minimum Statistics." 7th European Signal Processing Conference, Edinburgh, Scotland. Sep. 13-16, 1994. pp. 1-4.

Elko, G.W. "Differential Microphone Arrays." Audio Signal Processing for Next-Generation Multimedia Communication Systems. Springer U.S. ©2004. pp. 11-65.

\* cited by examiner

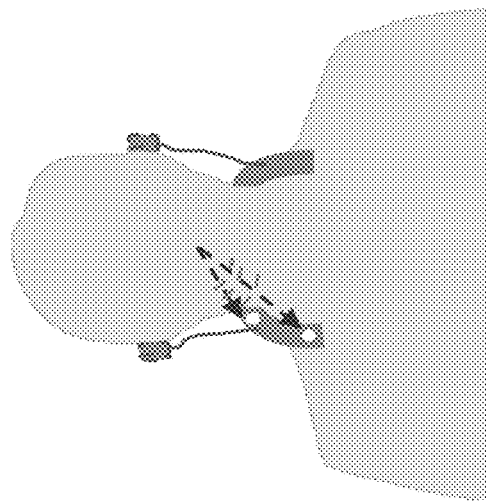
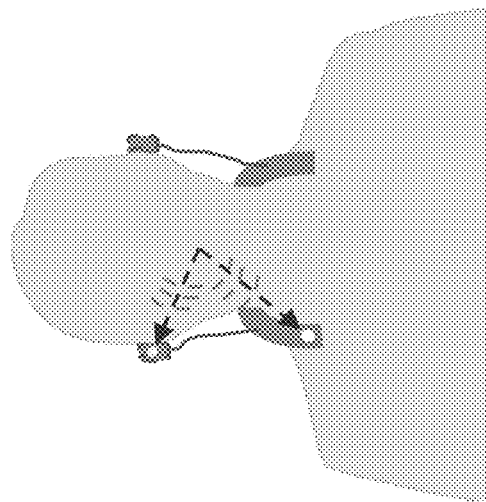
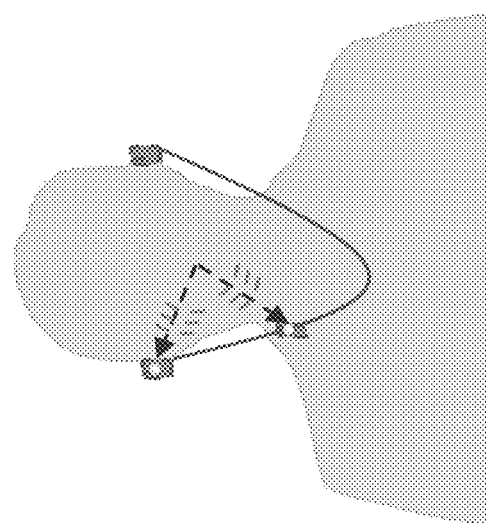
FIG. 1
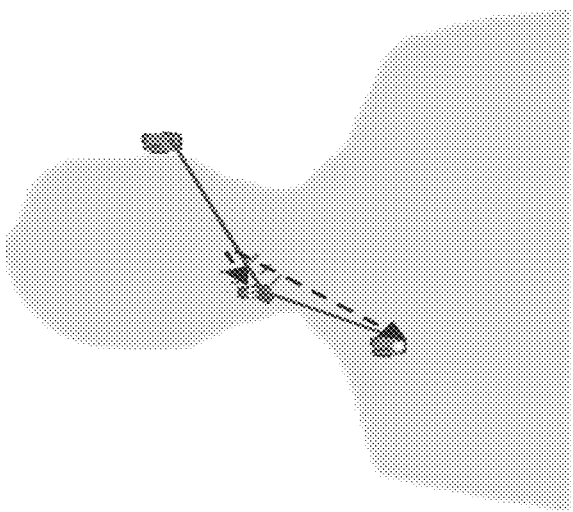
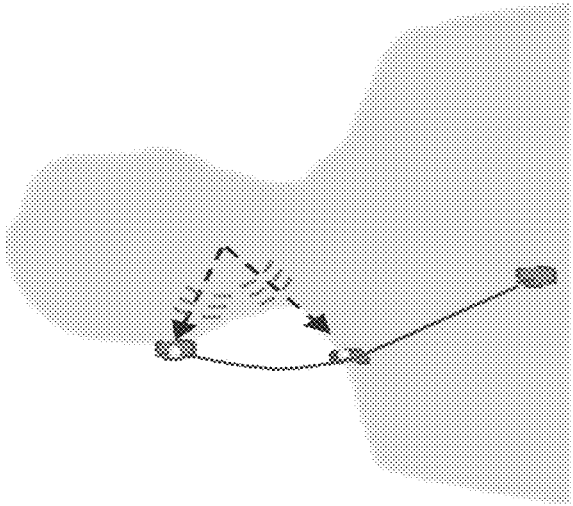
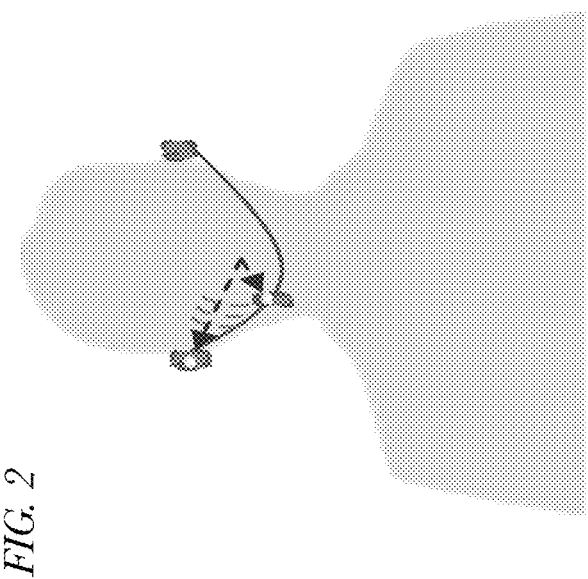
FIG. 2

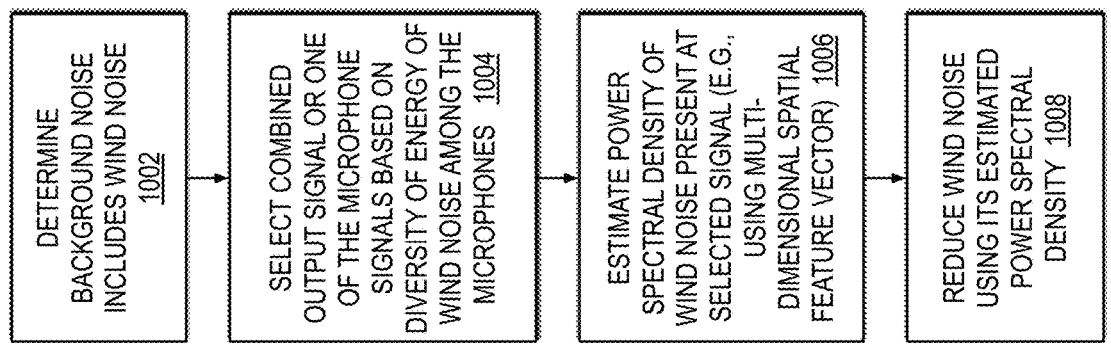
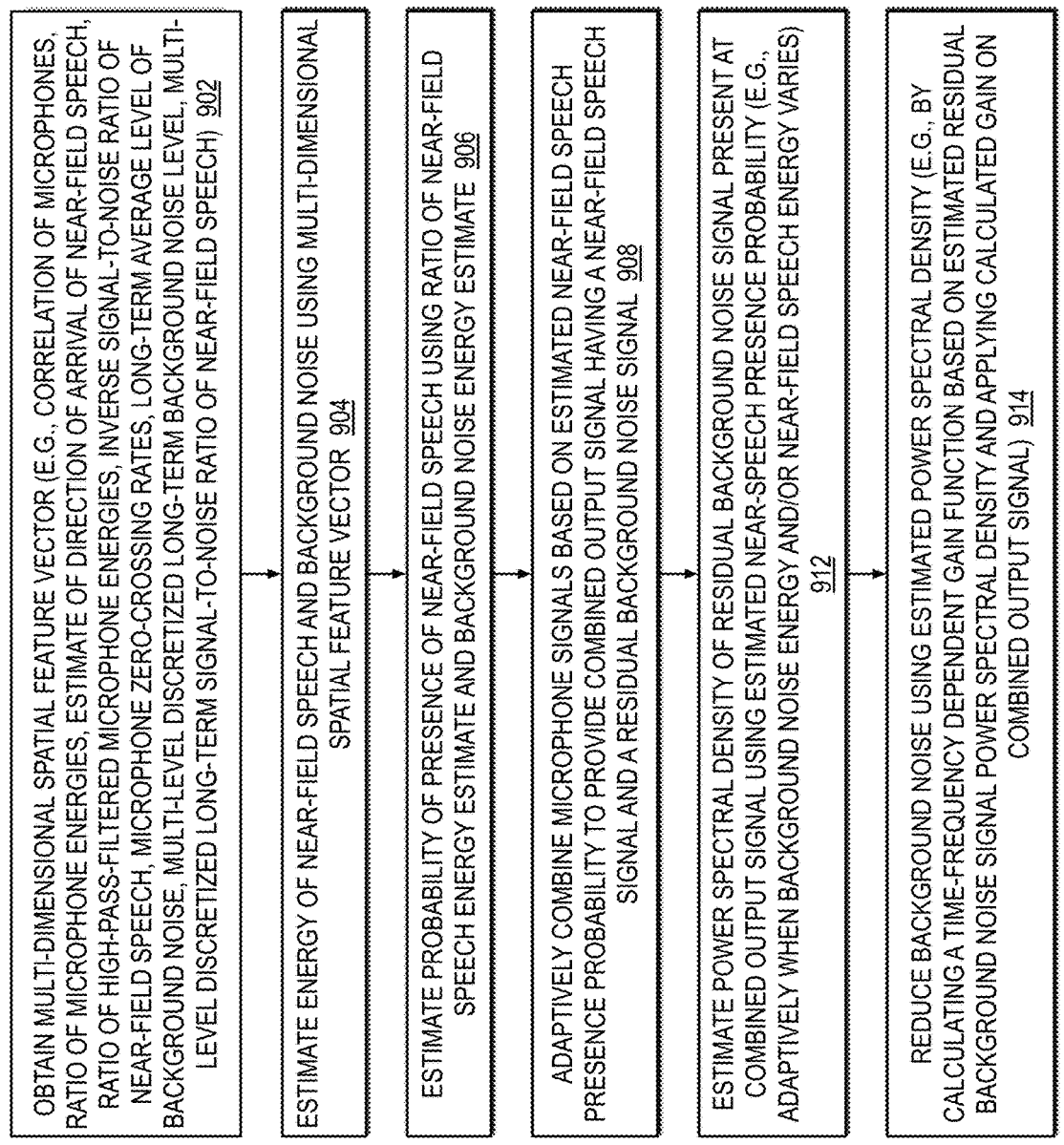

NOISE REDUCTION SYSTEM AND METHOD FOR AUDIO DEVICE WITH MULTIPLE MICROPHONES

CROSS REFERENCE TO RELATED APPLICATION(S)

This application claims priority based on U.S. Provisional Application, Ser. No. 62/630,358, filed Feb. 14, 2018, entitled DUAL MICROPHONE NOISE REDUCTION METHOD FOR HEADSETS WITH WIDELY SEPARATED MICROPHONES, which is hereby incorporated by reference in its entirety.

BACKGROUND

Hands free voice communications using an audio device can happen in diverse and harsh acoustic conditions such as automobiles, airports, restaurants, etc. Specifically, the background acoustic noise can vary from stationary noises such as road noise and engine noise to non-stationary noises like babble, competing talkers, and speeding vehicle noise. Moreover, the background noise level can also be dynamic in these environments. Hence, it is essential to reduce these unwanted background acoustic noises in order to improve the voice quality of a hands-free call. If the origin of these unwanted background noises and the user are spatially separated, then one could extract the desired speech corresponding to the user from the noisy speech. Spatial separation algorithms such as beamforming need more than one microphone to abstract the spatial information that is necessary to extract the desired speech. These multiple microphone-based algorithms improve the signal-to-noise ratio (SNR) of the noisy signal by exploiting the spatial diversity that exists between the microphones.

Stereo headsets, an example of an audio device, with dual microphone-based advanced speech enhancement/noise reduction algorithms are commonly used during a hands-free call. These stereo headsets come in different shapes and forms. Most of the dual microphone algorithms for headset applications assume that the microphone array orientation with respect to the user's mouth is fixed and known a priori. Spatial separation needed for maximum SNR improvement from a dual microphone algorithm forces the microphones to be placed on one of the ear cups of circumaural/supra-aural headsets. The prior knowledge of the array position with respect to user's mouth is exploited to preserve user's speech while reducing interference signals coming from other directions as described in U.S. Pat. Nos. 8,565,446 and 10,015,589 of Ebenezer, each of which is incorporated by reference in its entirety for all purposes. However, the physical dimension of many in-ear headsets restricts optimal placement of multiple microphones on an ear bud. Alternatively, one microphone can be placed in an ear bud (e.g., an active noise cancellation (ANC) reference microphone) and the other microphone can be placed either on the volume control box of an in-ear headset or on a protruding flap of a neck-band headset as shown in FIG. 1. The microphone spacing in such configurations tends to be large (e.g., greater than 100 millimeters) and a classical beamforming approach alone cannot provide sufficient performance improvement. For example, conventional front-end beamforming may not be desirable due to spatial aliasing. Additionally, noise correlation between the microphones is limited, and only limited noise reduction may be achieved from adaptive spatial filtering. Moreover, the user speech arrival direction is not fixed in such microphone array configurations due to various factors such as head movements, dangling of volume control box etc., as shown in FIG. 2. Still further, if a headset is used outdoors under windy conditions, the changes in the pressure induced by the air flow across the microphone diaphragm generates a high energy random noisy signal on the microphone signal. These high energy transient signals are intrusive in nature and may degrade the quality of a hands-free call made under windy conditions. Therefore, a dual microphone processing method designed for these types of array configurations that is robust to such dynamic changes is desirable.

SUMMARY

Embodiments are described that pertain to a noise reduction method for an audio device that has widely separated microphones with dynamically changing array orientation. The spatial diversity offered by the two widely spaced microphones is exploited by deriving a set of spatial features. A subset of spatial features may be derived by calculating the cross-correlation function between the two microphones. The remaining feature subset may be derived by calculating full-band and sub-band microphone energies. The two microphones may be first optimally combined to reduce the background noise through the use of an adaptive spatial filter. The control signals necessary for the adaptive spatial filter may be derived using a tree logic that uses each element of the spatial feature vector. The residual noise at the output of the adaptive spatial filter may be further reduced by first estimating the power spectral density (PSD) of the background noise. The spatial feature vector may be used to estimate the desired near-field speech energy and the energy of interfering background noise which then may be used to estimate the residual noise PSD. The estimated background noise PSD may be subtracted from the spatial filter output in frequency domain and the noise reduced frequency domain output then may be converted back to time domain. The spatial information may greatly help in reducing non-stationary noise types such as competing talker, babble, music, etc. The various control signals may be generated by comparing each feature element with a threshold. The thresholds applied on each element of the feature vector may be dynamically adjusted to account for changes in background noise and desired speech level. Specifically, the noise level may be discretized into five different levels, and different thresholds may be used for each prevailing noise level. Similarly, the SNR levels may be discretized into three different levels, and three different threshold sets may be used. The noise reduction algorithm may also include provisions to handle wind noise. Specifically, the spatial feature vector may be used to generate a control signal to select between microphone 1 signal, microphone 2 signal, and the spatial filter output signal that contains the least amount of wind noise. The wind noise present in the best signal may be further reduced by first estimating the PSD of wind noise and using the estimate to subtract the wind noise PSD from the best signal output.

In one embodiment, the present disclosure provides a method of voice processing for an audio device with an array of at least two microphones with dynamically changing array orientation to reduce background noise. The method includes obtaining a multi-dimensional spatial feature vector comprising at least a correlation of the at least two microphones and a calculation of at least one ratio of energies of the at least two microphones. The method also includes using the multi-dimensional feature vector to estimate an energy of near-field speech and to estimate an energy of background noise. The method also includes using a ratio of the near-field speech energy estimate and the background noise energy estimate to estimate a probability of a presence of the near-field speech. The method also includes adaptively combining signals from the at least two microphones based on the estimated near-field speech presence probability to provide a combined output signal comprising a near-field speech signal and a residual background noise signal. The method also includes estimating a power spectral density of the residual background noise signal present at the combined output signal using the estimated near-field speech presence probability. The method also includes reducing the background noise by using the estimated power spectral density.

In another embodiment, the present disclosure provides an audio device having an array of at least two microphones and a voice processing system that obtains a multi-dimensional spatial feature vector comprising at least a correlation of the at least two microphones and a calculation of at least one ratio of energies of the at least two microphones, uses the multi-dimensional feature vector to estimate an energy of near-field speech and to estimate an energy of background noise, uses a ratio of the near-field speech energy estimate and the background noise energy estimate to estimate a probability of a presence of the near-field speech, adaptively combines signals from the at least two microphones based on the estimated near-field speech presence probability to provide a combined output signal comprising a near-field speech signal and a residual background noise signal, estimates a power spectral density of the residual background noise signal present at the combined output signal using the estimated near-field speech presence probability, and reduces the background noise by using the estimated power spectral density.

In yet another embodiment, the present disclosure provides a non-transitory computer-readable medium having instructions stored thereon that are capable of causing or configuring an audio device having an array of at least two microphones and a voice processing system to perform operations that include obtaining a multi-dimensional spatial feature vector comprising at least a correlation of the at least two microphones and a calculation of at least one ratio of energies of the at least two microphones, using the multi-dimensional feature vector to estimate an energy of near-field speech and to estimate an energy of background noise, using a ratio of the near-field speech energy estimate and the background noise energy estimate to estimate a probability of a presence of the near-field speech, adaptively combining signals from the at least two microphones based on the estimated near-field speech presence probability to provide a combined output signal comprising a near-field speech signal and a residual background noise signal, estimating a power spectral density of the residual background noise signal present at the combined output signal using the estimated near-field speech presence probability, and reducing the background noise by using the estimated power spectral density.

BRIEF DESCRIPTION OF THE DRAWINGS

FIG. 1 is three depictions of a user wearing in-ear and neck-band headsets having ear bud microphones, volume control box microphones, and/or protruding flap microphones to illustrate differences in microphone spacing.

FIG. 2 is three depictions of a user wearing in-ear headsets in three different microphone array configurations to illustrate the user speech arrival direction is not fixed due to various factors such as head movements, dangling of volume control box etc.

FIG. 9 is a flowchart illustrating operation of a noise reduction system of FIG. 6 to reduce noise in accordance with embodiments of the present disclosure.

FIG. 10 is a flowchart illustrating operation of a noise reduction system of FIG. 6 to reduce noise in accordance with embodiments of the present disclosure.

DETAILED DESCRIPTION

Figure 4:
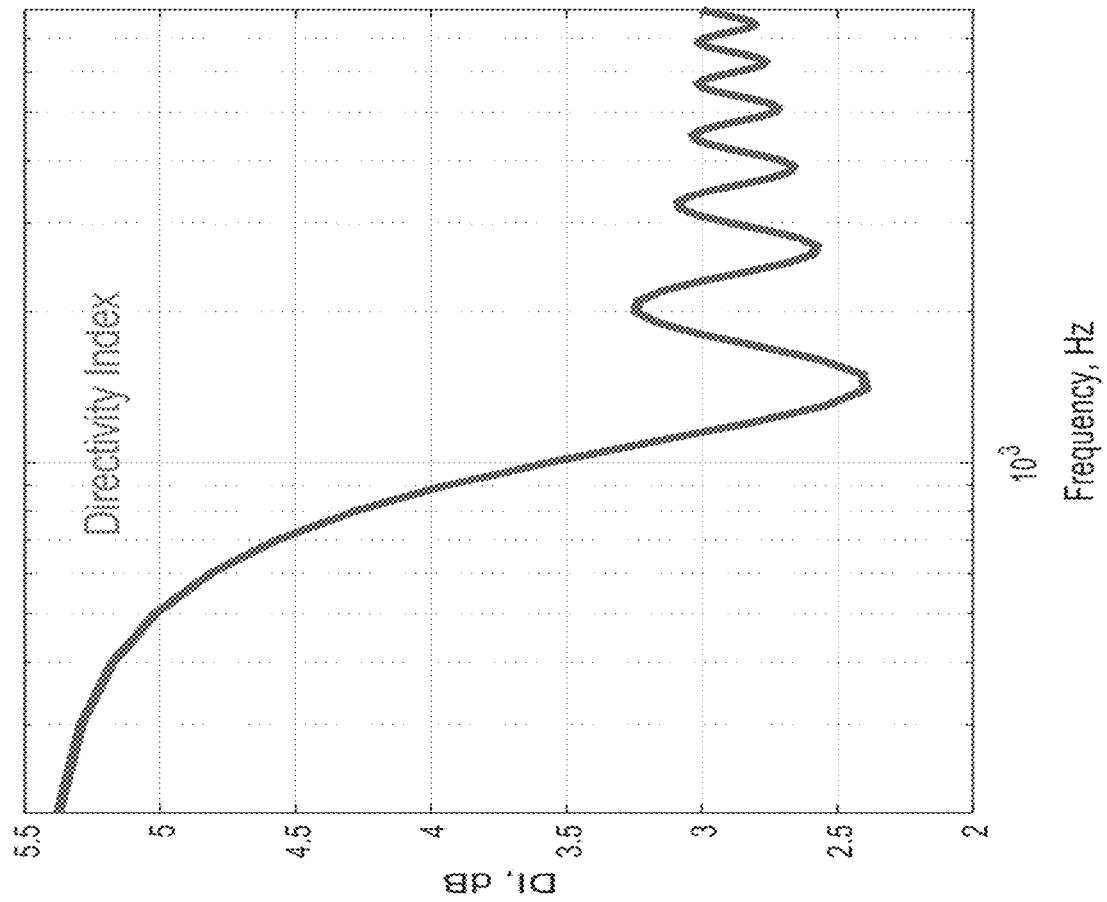
FIG. 4 is a graph illustrating directivity index (DI) as a function of frequency for a system in a configuration such as that of FIG. 3.
Figure 3:
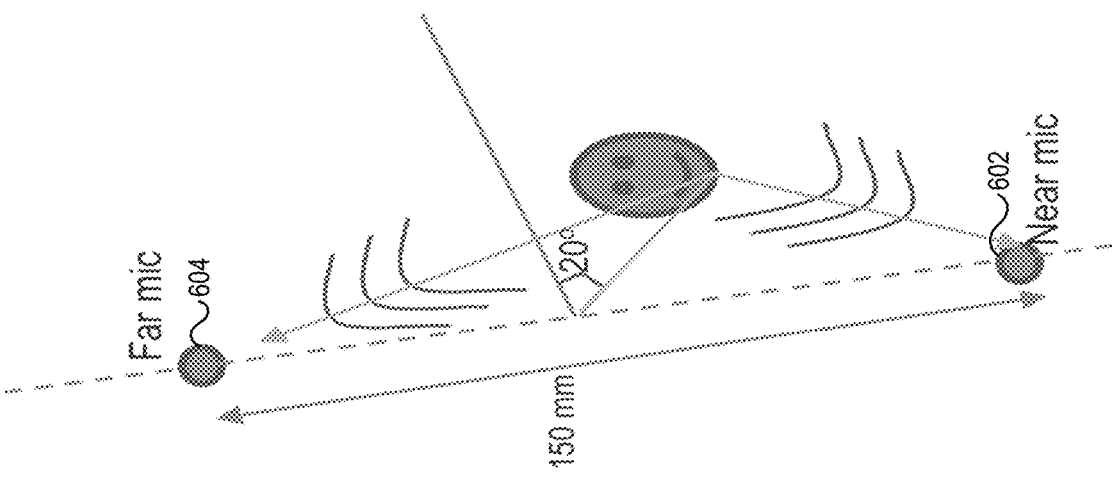
FIG. 3 is a diagram illustrating an example of a microphone orientation in a side pendant configuration of an audio device with respect to a user's mouth.
Figure 5A:
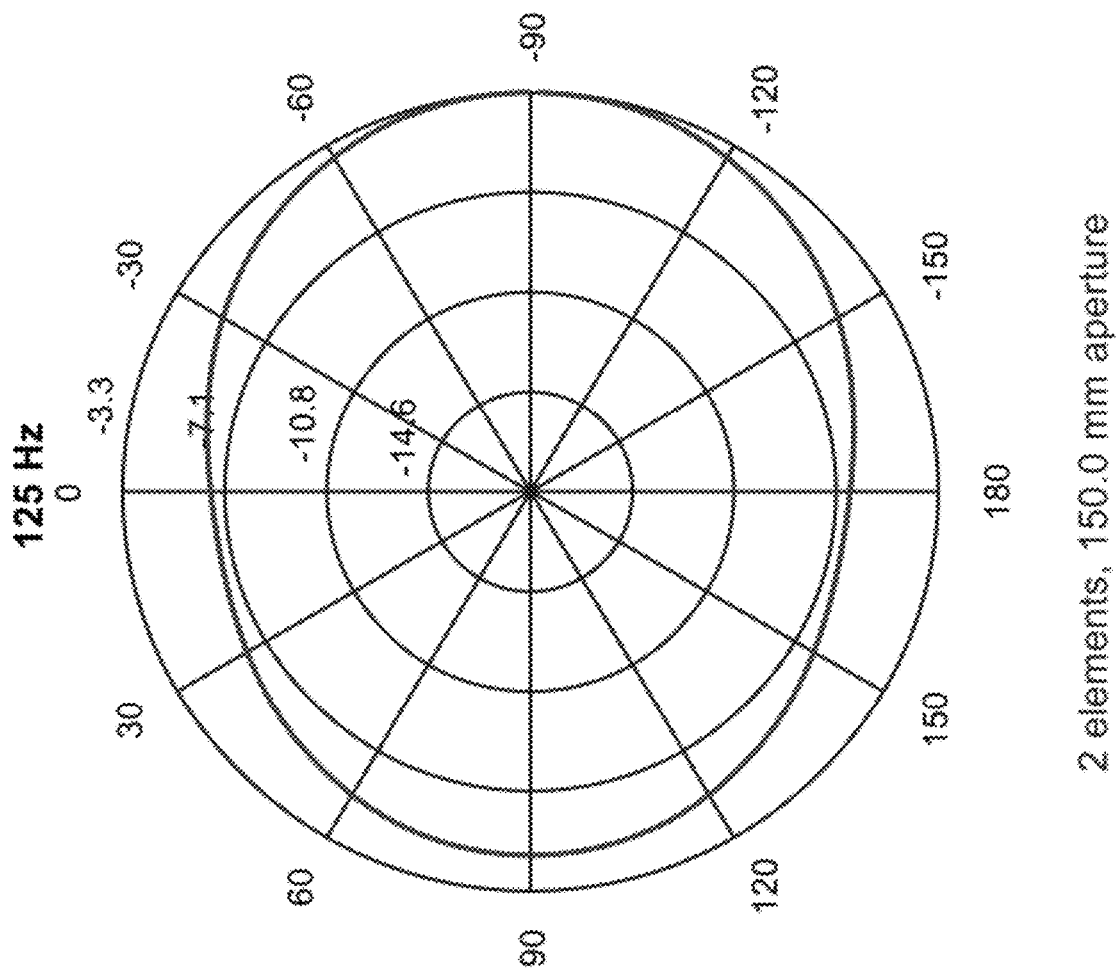
FIGS. 5A through 5H are eight polar plots indicating spatial response of a conventional Minimum Variance Distortionless Response (MVDR) near-field beamformer employed in a device having multiple microphones at eight different respective frequencies.
Figure 5B:
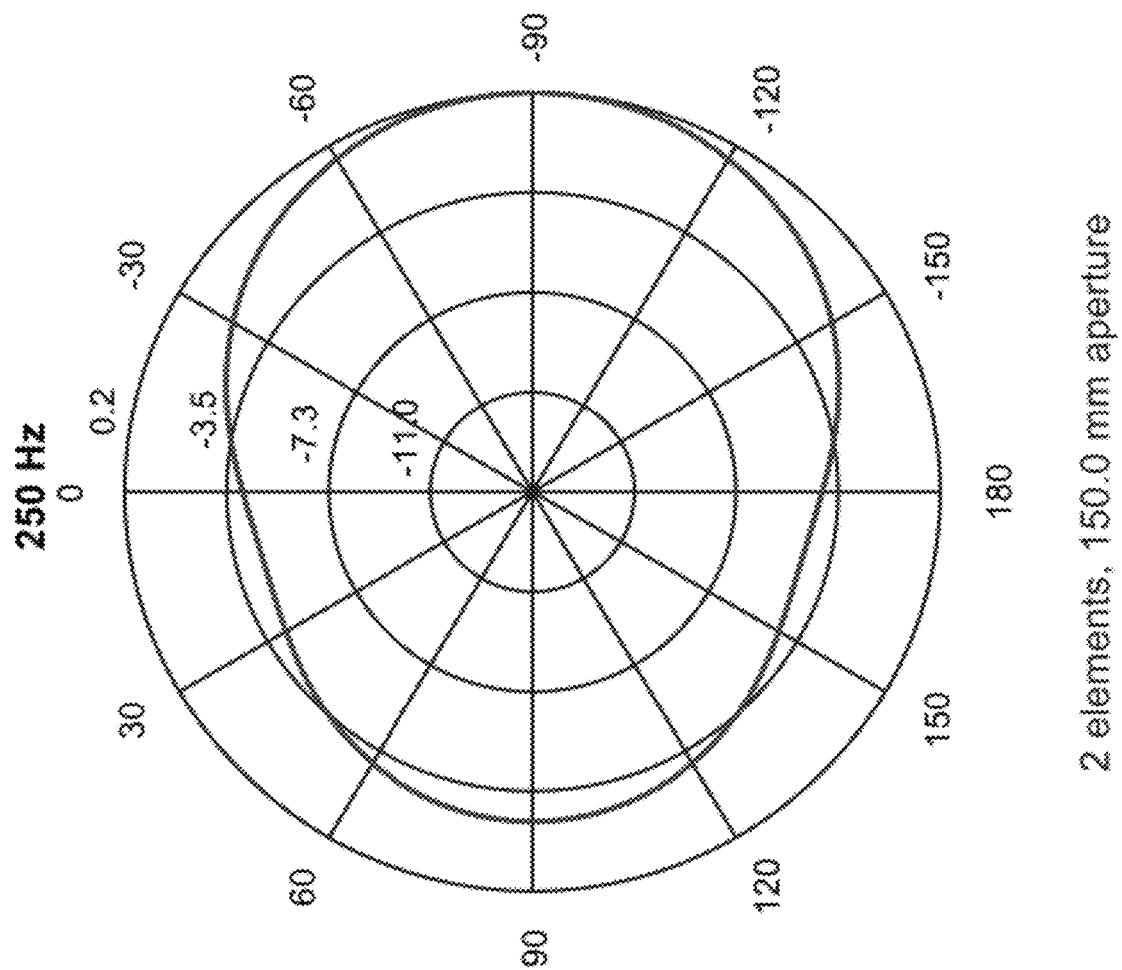
Figure 5C:
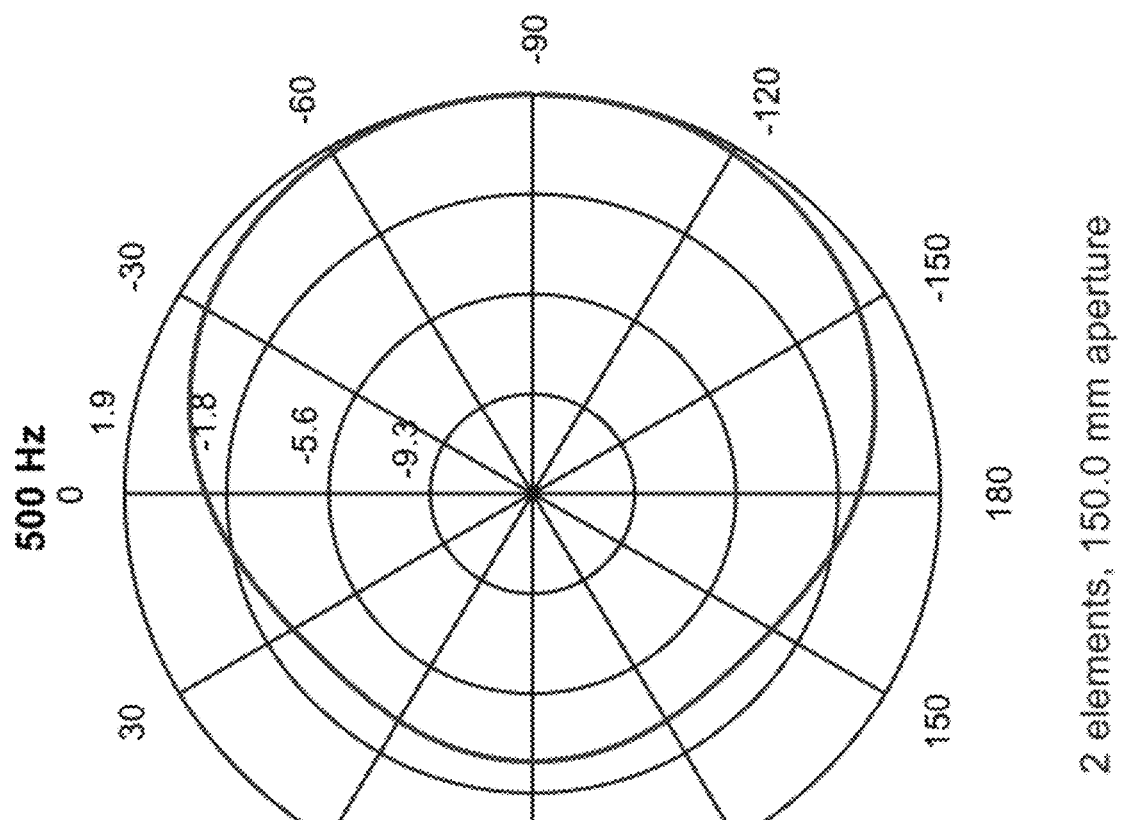
Figure 5D:
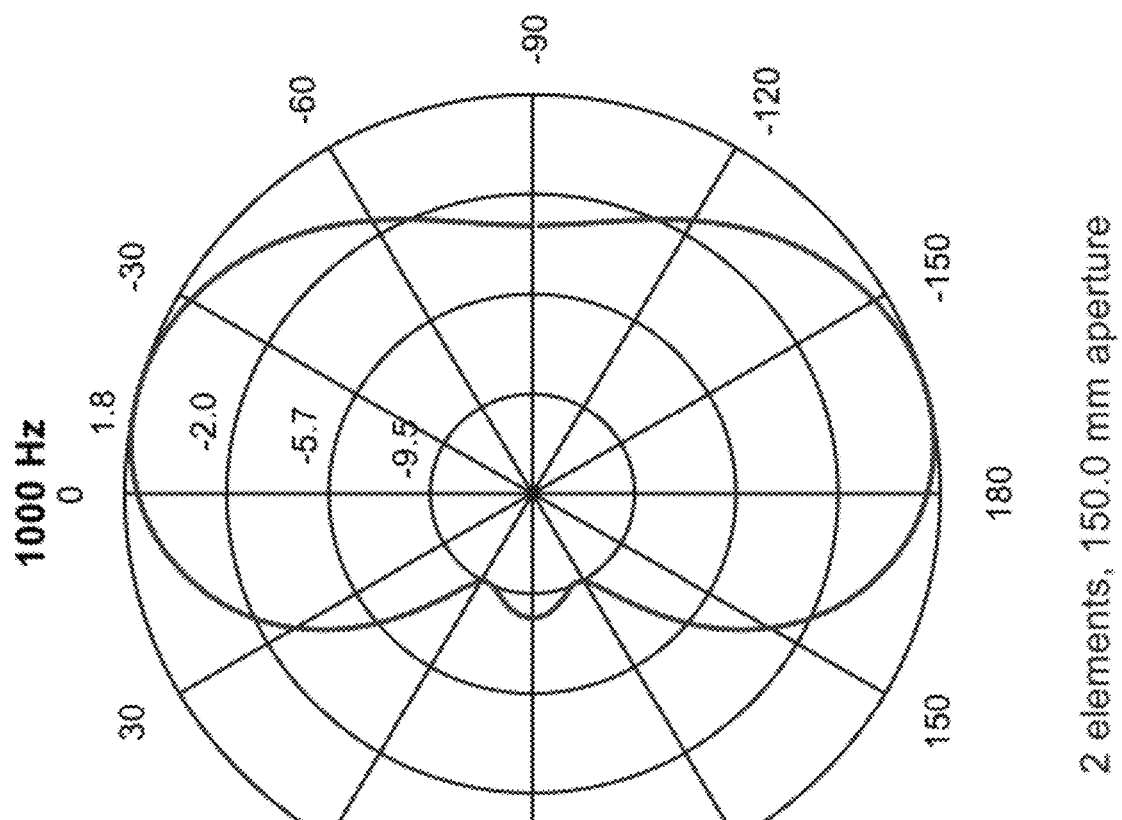
Figure 5E:
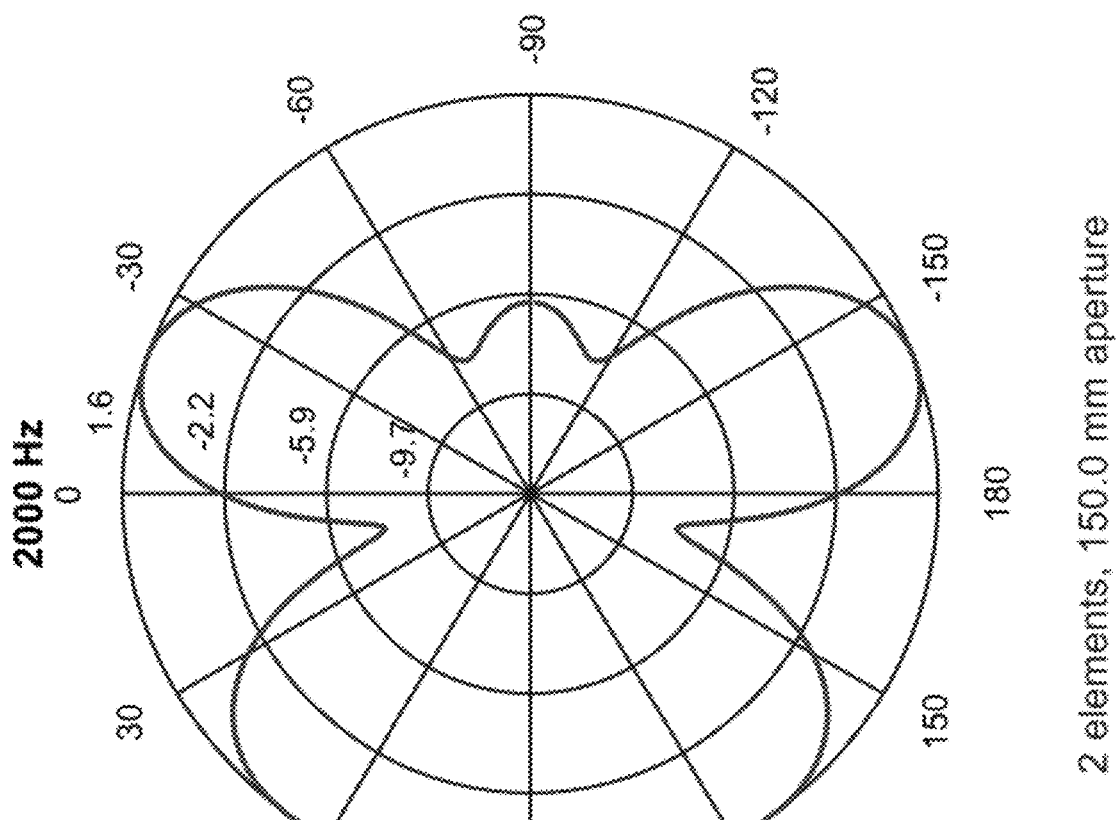
Figure 5F:
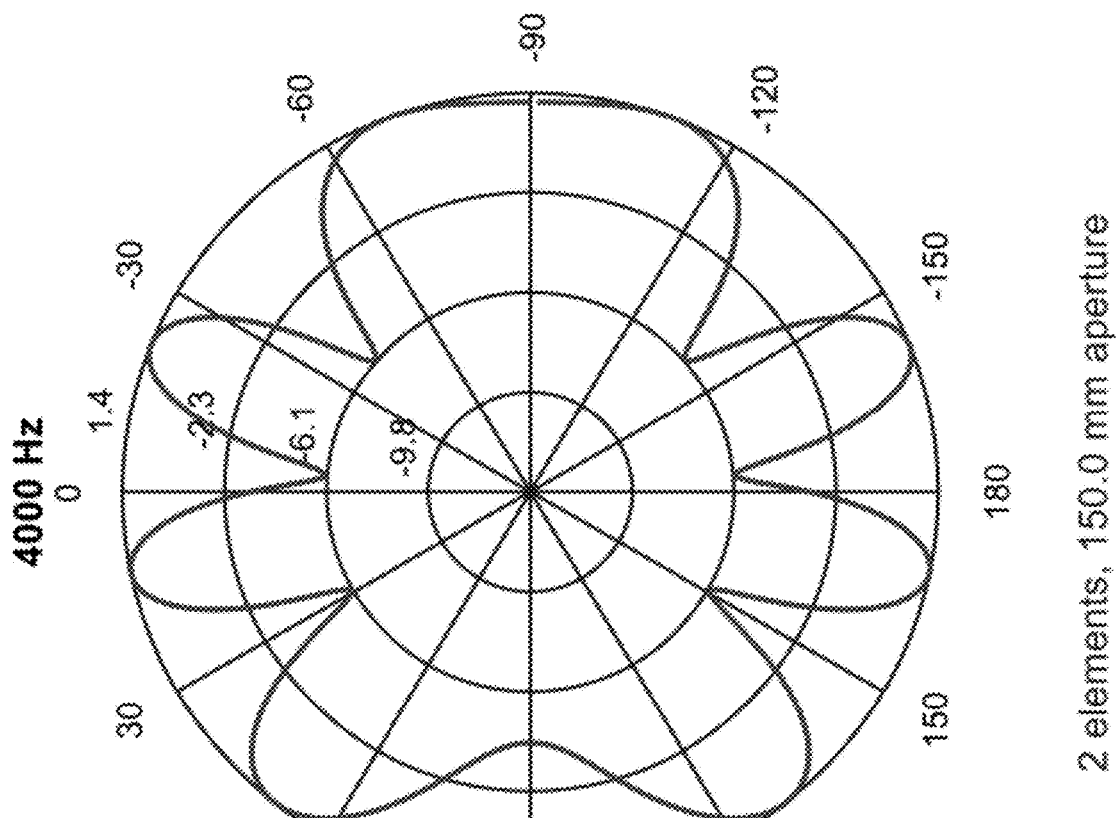
Figure 5G:
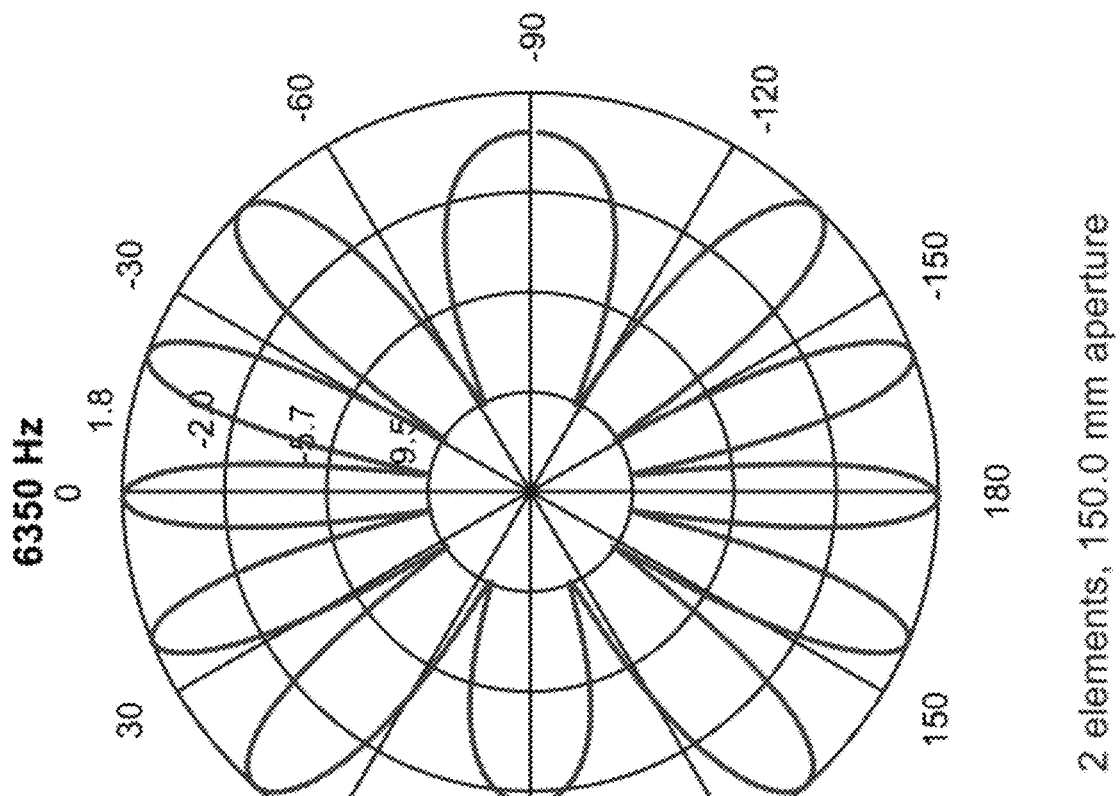
Figure 5H:
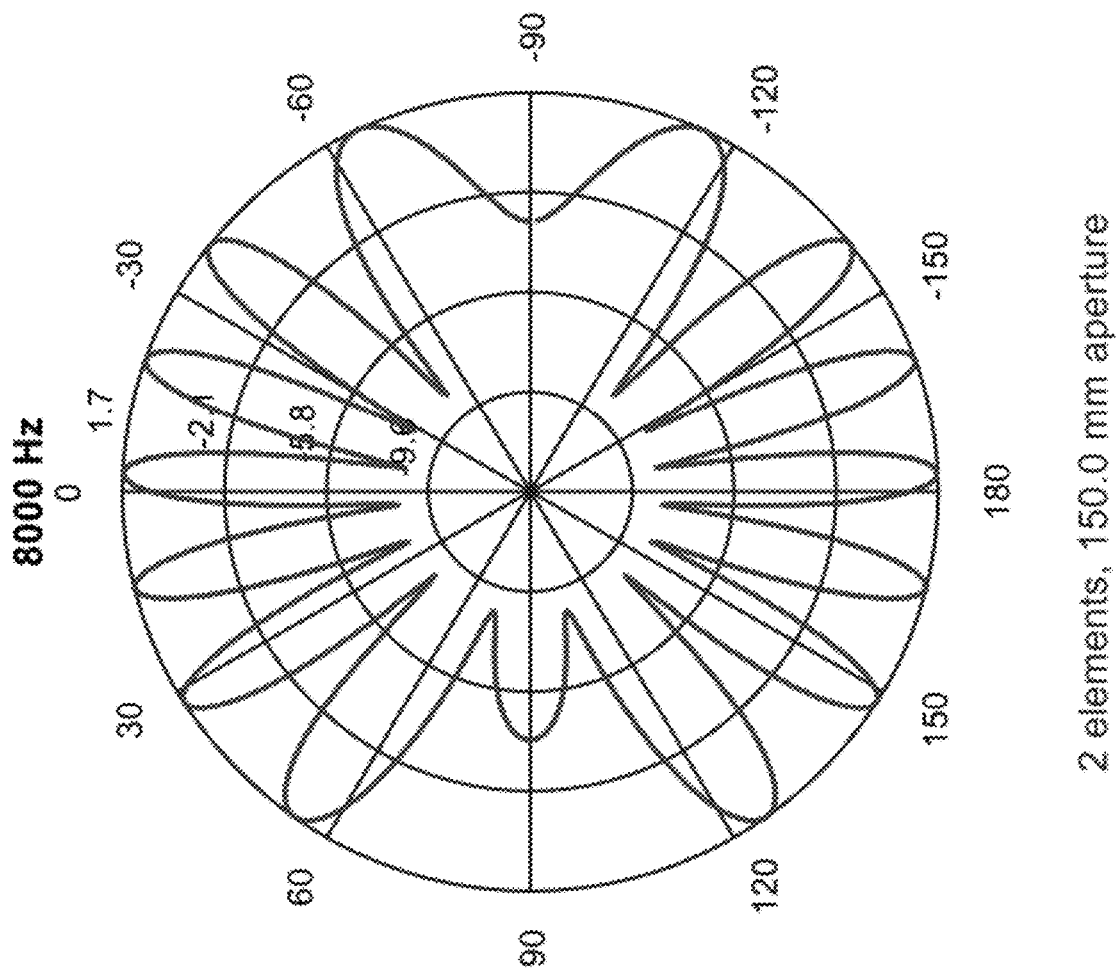

Disclosed are embodiments of spatial processing-based noise reduction systems and methods for audio devices (e.g., headsets and handsets) with widely separated microphones (e.g., greater than 100 mm), e.g., for situations in which it is not possible to closely place multiple microphones in one ear bud. For example, the method is suited for headsets in which one microphone is placed on an ear bud and another microphone is placed either on the volume control box or on the protruding flaps of a neck-band type headset. Multiple spatial features are derived and used to control an adaptive filter that models the background noise present in the microphone signal that has the best SNR. In addition, the spatial features are used to dynamically update the residual background noise estimate that is critical for a single channel spectral subtraction-based noise reduction algorithm. The background noise may include a competing talker. The accurate spatial controls derived by exploiting the near-field effects help in differentiating temporally non-stationary interfering background noise signals from the desired speech signal. The user's speech arrival direction in the abovementioned headsets may not remain constant, and the method in accordance with the present disclosure ensures that the user's speech is preserved under varying conditions. A wind noise handling scheme in accordance with the present disclosure may quickly suppress high energy wind noise. In order to improve the usability of the headset in windy conditions, the spatial statistics are used to detect the presence of wind. The wide separation between microphones is exploited for wind noise handling by selecting the best microphone signal that depends on the direction from which the wind is blowing. The best microphone signal is further processed to reduce the residual wind noise. In one embodiment, microphones may be considered widely separated if they are so distantly separated that beam-forming is relatively ineffective. FIGS. 3 through 5 will now be employed to describe ineffectiveness of beamforming techniques in wide microphone separation situations.

Referring now to FIG. 3, a diagram illustrating an example of a microphone orientation in a side pendant configuration of an audio device with respect to a user's mouth is shown. The microphone configuration includes a near microphone 602 and a far microphone 604. The near microphone 602 refers to the microphone that is nearest to the desired signal source, e.g., the mouth of the talker, and the far microphone 604 refers to the microphone that is farthest away from the desired signal source. In the example, the microphone spacing is 150 millimeters, the user speech arrives at 20° from the phase center of the microphone array such that the look direction is −20°, and the propagation loss between the near microphone 602 and the far microphone 604 is 6 dB. Furthermore, the speech direction is close to the far-field noise direction (broadside).

Referring now to FIG. 4, a graph illustrating directivity index (DI) measured in dB as a function of frequency measured in Hz for a system in a configuration such as that of FIG. 3 is shown. The directivity index is an expression of beamforming effectiveness. As shown, the directivity index is approximately 5.4 dB near DC and drops in exponentially-decaying sinusoidal fashion settling below 3 dB as the frequency increases. More specifically, the directivity index drops below 3 dB shortly after 1 kHz, which indicates relatively ineffective beamforming at higher frequencies. Advantageously, embodiments of a noise reduction system and method for an audio device having multiple widely separated microphones described herein improve noise cancellation beyond conventional beamforming techniques. Embodiments use unconventional methods to reduce background noise, such as by exploiting near-field effects. Advantageously, the noise reduction methods are robust to various microphone array orientations and handle wind noise well.

Referring now to FIGS. 5A through 5H, eight polar plots indicating spatial response of a conventional Minimum Variance Distortionless Response (MVDR) near-field beamformer employed in a device having multiple microphones (e.g., a configuration such as that of FIG. 3) at eight different respective frequencies (125, 250, 500, 1000, 2000, 4000, 6350 and 8000 Hz) are shown. As may be observed from the plots, spatial aliasing may result in grating lobes, especially at higher frequencies, such that there are large attenuations at certain angles of direction. Consequently, SNR improvement may be limited at high frequencies. The effect may be attributable to microphone array spacing that is too wide. In the example, speech from the look direction may be suppressed at some high frequencies, or noise may get boosted. The plots of FIGS. 5A through 5H may provide yet another indication of the relative ineffectiveness of beamforming at higher frequencies and the need for improved noise cancellation beyond conventional beamforming techniques.

Figure 6:
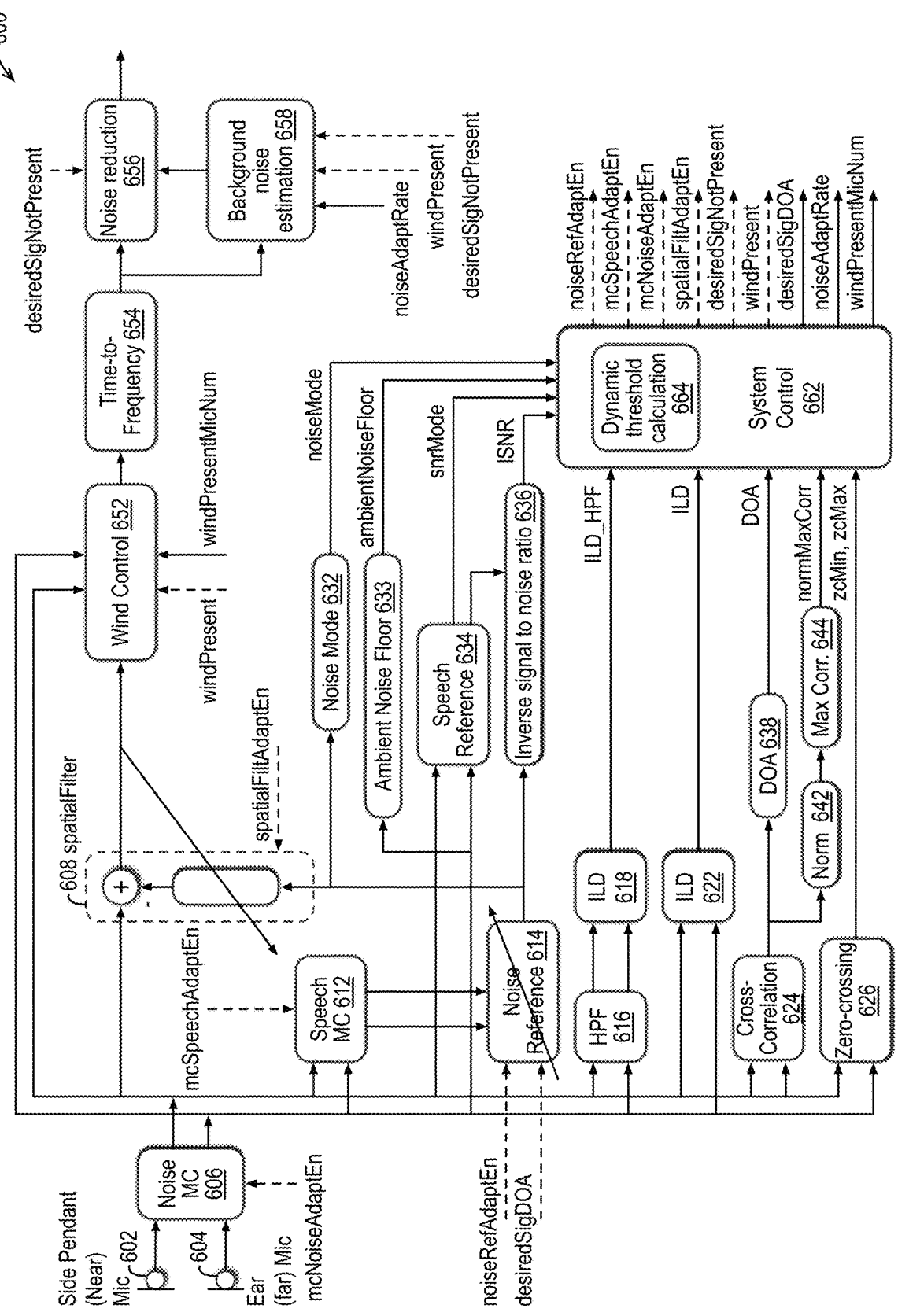
FIG. 6 is a block diagram illustrating an audio device system for reducing noise in accordance with embodiments of the present disclosure.

Referring now to FIG. 6, a block diagram illustrating an audio device system 600 for reducing noise in accordance with embodiments of the present disclosure is shown. Generally speaking, the system 600 performs various functions including but not limited to microphone calibration, spatial filtering, spectral processing, spatial feature extraction, wind noise handling, and includes master control logic. The system 600 includes a near microphone 602 (e.g., side pendant microphone), a far microphone 604 (e.g., ear microphone), a noise microphone calibration (MC) block 606, a spatial filter 608, a speech MC block 612, a noise reference block 614, a high pass filter (HPF) 616, a first inter-microphone level difference (ILD) block 618, a second ILD block 622, a cross-correlation block 624, a zero-crossing block 626, a noise mode block 632, an ambient noise floor block 633, a speech reference block 634, an inverse signal-to-noise ratio (ISNR) block 636, a direction of arrival (DOA) block 638, a normalizing block 642, a maximum correlation block 644, a wind control block 652, a time-to-frequency conversion block 654, a noise reduction block 656, a background noise estimation block 658, and a system control block 662 that includes a dynamic threshold calculation block 664. The various blocks, filters, control and other elements described herein may be implemented in hardware, software or a combination of hardware and software, such as programmable logic, digital signal processors (DSP), or discrete circuits.

Generally speaking, the system 600 operates using spatial statistics, or features, that make up a multi-dimensional spatial feature vector. Advantageously, the spatial statistics are derived from signals of multiple microphones, which provides opportunities for noise cancelling not realizable in systems that use statistics derived from a single microphone. The spatial features, or statistics, may include but are not limited to the following. The presence of a directional near-field signal may be determined using a maximum of a normalized cross-correlation statistic (normMaxCorr), e.g., the output of maximum correlation block 644. Angle of arrival information may be provided by a direction of arrival estimate (DOA), e.g., the output of DOA block 638. Proximity of the microphone closest to the user's mouth may be determined by an inter-microphone level difference (ILD), e.g., the output of ILD block 622. Un-voiced speech presence may be determined using a high frequency inter-microphone level difference (ILD_HPF), e.g., the output of ILD block 618. Instantaneous inverse signal to noise ratio may provide a probability of a near-field signal arriving from a pre-specified direction (ISNR), e.g., the output of ISNR block 636. A zero-crossing rate may provide an indication of the presence of wind (zcMin, zcMax), e.g., outputs of zero-crossing block 626. An ambient noise floor (ambientNoiseFloor) may provide the long-term average of the background noise, e.g., the output of ambient noise floor block 633. A noise mode may provide a multi-level discretized long-term background noise level (noiseMode), e.g., the output of noise mode block 632. In one embodiment, the noise mode may provide a five-level discretized long-term background noise level. An SNR mode may provide a multi-level discretized long-term signal to noise ratio (snrMode), e.g., an output of speech reference block 634. In one embodiment, the SNR mode may provide a three-level long-term signal to noise ratio.

The system control block 662 uses the spatial features to generate control signals that include but are not limited to the following. The noiseRefAdaptEn control signal is provided to the noise reference block 614 and indicates when the noise reference block 614 may adaptively update a noise reference signal. The mcSpeechAdaptEn control signal is provided to the speech MC block 612 and indicates when the speech MC block 612 may adaptively update speech calibration gain values. The mcNoiseAdaptEn control signal is provided to the noise MC block 606 and indicates when the noise MC block 606 may adaptively update noise calibration gain values. The spatialFiltAdaptEn control signal is provided to the spatial filter block 608 and indicates when the spatial filter block 608 may adaptively update the manner in which it combines microphone signals. The desiredSigNotPresent control signal is provided to the background noise estimation block 658 and noise reduction block 656 and indicates the presence or absence of a desired speech signal. The windPresent control signal is provided to the background noise estimation block 658 and the wind control block 652 and indicates the presence or absence of wind noise. The desiredSigDOA control signal is provided to the noise reference block 614 and indicates the direction of arrival of the desired speech. The noiseAdaptRate control signal is provided to the background noise estimation block 658 and indicates a rate at which the background noise estimation block 658 may estimate the power spectral density of the residual background noise signal present in the output signal of the time-to-frequency block 654. The windPresentMicNum control signal is provided to the wind control block 652 and indicates the microphone (e.g., near microphone 602 or far microphone 604) in which the greatest amount of wind noise is present. An embodiment of the multi-dimensional spatial feature will now be described.

The system control block 662 may generate the control signals (e.g., noiseRefAdaptEn, mcSpeechAdaptEn, mcNoiseAdaptEn, spatialFiltAdaptEn, desiredSigNotPresent, windPresent, desiredSigDOA, noiseAdaptRate, windPresentMicNum) by comparing the multi-dimensional spatial feature vector elements (e.g., normMaxCorr, DOA, ILD, ILD_HPF, ISNR, zcMin, zcMax, ambientNoiseFloor, noiseMode, snrMode) with thresholds. The dynamic threshold calculation block 664 may dynamically adjust the thresholds, e.g., in response to changes in the levels of background noise and desired speech. Examples of the thresholds include zero-crossing thresholds, normalized maximum correlation thresholds, ambient noise floor thresholds, noise level thresholds, and SNR level thresholds, which are described in more detail below.

The spatial features, or statistics, of the multi-dimensional spatial feature vector may be used by the system control block 662 to generate the control signals that may be used to, for example, estimate the level of the background noise by combining the microphone signals, e.g., noise reference signal output by noise reference block 614 and that is provided to the spatial filter 608. The estimated background noise may be subtracted from the microphone with best SNR, e.g., by spatial filter 608. The spatial statistics, or features, of the multi-dimensional spatial feature vector may be further used to control a power spectral density (PSD) estimation of the residual background acoustic or wind noise, e.g., by background noise estimation block 658. The estimated PSD may be used, e.g., by noise reduction block 656, to remove the residual noise, e.g., in the frequency domain on a bin-by-bin basis.

The near microphone 602 and the far microphone 604 generate respective signals provided to the noise MC block 606 in response to sound impinging on the respective microphones. The near microphone 602 and the far microphone 604 are widely separated, e.g., by about 100 mm or more.

The noise MC block 606 and the speech MC block 612 perform calibration on the near microphone 602 and the far microphone 604 signals. The noise MC block 606 provides calibrated versions of the near microphone 602 and far microphone 604 signals to the wind control block 652, spatial filter 608, speech MC block 612, speech reference block 634, ambient noise floor block 633, HPF 616, second ILD block 622, cross-correlation block 624, and zero-crossing block 626. The speech MC block 612 provides calibrated versions of the near microphone 602 and far microphone 604 signals to the noise reference block 614. The calibration of the microphone signals may be particularly important to calculation of the ILD and the ILD_HPF statistics, described more below, to avoid bias therein. A near-field propagation loss effect caused by the close proximity of the signal source to the microphone array (e.g., propagation loss and diffraction around the face of a user, that may be detected by exploiting the spatial diversity that exists between the widely-spaced near microphone 602 and far microphone 604, particularly when one of the microphones is located close to the mouth and the other is located away from the mouth) may introduce microphone level differences. The degree of near-field effect may vary with different headset positions. Therefore, the microphone calibration sub-system is split into the noise MC block 606 and the speech MC block 612. The noise MC block 606 compensates for sensitivity difference from the individual microphone channels. In one embodiment, the calibration gains corresponding to the noise MC block 606 may be updated (e.g., which may be indicated by the mcNoiseAdaptEn control signal) only when spatially correlated diffuse and/or far-field noise is present. The speech MC block 612 compensates for near-field effects. In one embodiment, calibration gains corresponding to the speech MC block 612 may be updated (e.g., which may be indicated by the mcSpeechAdaptEn control signal) only when the desired speech is detected. In one embodiment, the calibration gains of the speech MC block 612 may be updated when speech is detected, a signal arrival direction is within a speech acceptance angular range, there is a high degree of correlation between the microphones, and the ambient noise floor is not very high. Since the calibration gains may be updated in a mutually exclusive manner, changes in the noise MC block 606 are appropriately adjusted in the speech MC block 612 since the near-field compensation gain may be calculated based on the signal output from the noise MC block 606. In one embodiment, the calibration gains of the noise MC block 606 may be updated when speech is not detected, there is a medium degree of correlation between the microphones (e.g., to avoid adapting to uncorrelated electrical noise), and an appreciable amount of ambient noise is present.

The noise reference block 614 combines the calibrated near microphone 602 and far microphone 604 signals to generate a noise reference signal that is an estimate of the level of the background noise and that is provided to the ISNR block 636, the noise mode block 632, and the spatial filter 608. The noise reference block 614 receives the noiseRefAdaptEn and desiredSigDOA control signals. In one embodiment, the noise reference block 614 adaptively models the noise present in the microphone signal that has the best SNR similar to a manner described in U.S. Pat. No. 9,607,603, which is hereby incorporated by reference in its entirety for all purposes. The noise reference block 614 may combine the two microphone signals 602 and 604 such that the desired speech signal leakage in the noise reference signal is minimized to avoid speech suppression during the background noise removal process. In one embodiment, the noise reference signal may be obtained using an adaptive nullformer with the null focused towards the desired speech direction. In another embodiment, the noise reference signal may be obtained using a robust filter that equalizes the near microphone 602 to match the desired speech spectrum in the far microphone 604 to achieve desired speech cancellation.

ILD block 622 calculates a ratio of the energy of the far microphone signal to the energy of the near microphone signal, which is provided as statistic ILD to the system control block 662. The power of acoustic waves propagating outwards in a free field from a source will decrease as a function of distance 'R' from the center of source. Specifically, the power is inversely proportional to square of the distance 'R'. If a dual microphone array is nearby a near-field desired signal source, this phenomenon may be exploited by comparing signal levels between far and near microphones. The inter-microphone level difference (ILD) may differentiate between a near-field desired signal and a far-field or diffuse field interfering signal, if the near-field signal is sufficiently louder than the far-field signal. The ILD spatial feature may be used to detect the proximity of the microphone closest to the user's mouth. Generally, ILD in the near field is higher at larger microphone spacings. On the other hand, ILD between the microphones does not generally vary significantly in far-field and diffuse-field conditions at all microphone spacings. For a widely spaced microphone array, ILD may be used to detect the presence of near-field signals particularly at high and moderate SNR conditions.

The HPF 616 passes the high frequencies of the near and far microphone signals and provides the filtered signals to ILD block 618. ILD block 618 calculates a ratio of the high-frequency energy of the far microphone signal to the high-frequency energy of the near microphone signal, which is provided as statistic ILD_HPF to the system control block 662. The ILD_HPF spatial feature may be used to detect the presence of un-voiced speech. The full-band ILD statistic generated by ILD block 622 may be useful to detect voiced near-field speech segments at moderate and high SNR conditions. However, the ILD statistic may fail to detect un-voiced speech segments even at moderate noise conditions. The energy of un-voiced speech is typically low and, therefore, the SNR tends towards a lower value even at moderate noise levels. Even though un-voiced speech segments have poor SNR, propagation loss phenomenon still exists between the microphones. Moreover, at high frequencies, the level difference is exaggerated by absorption of near-field signals as sound waves propagate across the face of the user. The un-voiced speech segments predominantly consist of high frequency components and most of the acoustic background noises do not contain high energy components at the higher end of the spectrum. Therefore, the HPF 616 is employed to improve the detection of un-voiced speech segments for the ILD_HPF computations. In one embodiment, the HPF 616 has a corner frequency of approximately 2.5 kHz.

The cross-correlation block 624 cross-correlates the near microphone signal and the far microphone signal and provides the cross-correlation result to the DOA block 638 and to the normalization block 642. The DOA block 638 may interpolate the cross-correlation result (e.g., using the Lagrange interpolation function) and estimate the DOA statistic provided to the system control block 662 by selecting the lag corresponding to the maximum value of the interpolated cross-correlation, which may be converted to an angular value and median filtered. The near-field speech direction may be used to compute the ISNR and also by the adaptive spatial filter 608, e.g., adaptive nullformer. In one embodiment, the estimated DOA is updated as the null direction only when correlated speech arriving from the desired speech acceptance angle is detected. The update DOA (desiredSigDOA) may be further smoothed. In order to avoid clicking artifacts, the updated null direction may be applied to the nullformer only when the updated direction deviates from the current null direction by a certain value. The control signal (noiseRefAdaptEn) may be used to update the adaptive system in an embodiment in which a robust nullformer is used rather than an adaptive nullformer. Similarly, the noiseRefAdaptEn control signal may be used to control the speech reference block 634 that generates the long term SNR estimation (snrMode) and a speech reference signal that is provided to the ISNR block 636.

The normalization block 642 normalizes the cross-correlation result relative to the energies of the microphone signals. The maximum correlation block 644 selects the frame in a time sequence of frames having the maximum normalized cross-correlation result, which is provided to the system control block 662 as the maximum normalized cross-correlation statistic, normMaxCorr. When an acoustic source is close to a microphone, the direct to reverberant signal ratio at the microphone is usually high. The direct to reverberant ratio usually depends on the reverberation time (RT60) of the room/enclosure and other physical structures that are in the path between the near-field source and the microphone and also the proximity of the near microphone to the desired sound source. When the distance between the source and the microphone increases, the direct to reverberant ratio decreases due to propagation loss in the direct path, and the energy of reverberant signal will be comparable to the direct path signal. This concept may be extended to derive the normMaxCorr statistic that may indicate the presence of a directional near-field signal in a manner that is robust to array position.

The zero-crossing block 626 examines the near microphone signal and the far microphone signal to generate minimum and maximum zero-crossing rates, zcMin and zcMax, which may be used to provide an indication of the presence of wind. Wind noise, which is transient in nature, is caused by air flow turbulence around a microphone. The spectral energy distribution of wind noise is generally concentrated around low frequencies, which can be exploited to detect the presence of wind by counting the number of zero crossings in a frame of raw microphone samples. In one embodiment, due to large separation between the two microphones, the recorded wind signals may have different signal characteristics depending on the direction from which the wind is blowing. Hence, the zero-crossing rate may be calculated for each microphone and the two statistics may be combined and then used in the decision logic of the system control block 662.

The noise mode block 632 uses the noise reference signal to generate a multi-level discretized long-term background noise level statistic, noiseMode, which is provided to the system control block 662. In one embodiment, the noise reference signal is an instantaneous indication of the background noise energy. In one embodiment, the output energy of a noise beamformer, described below with respect to the ISNR block 636, may be used as a background noise level estimate and smoothed using a recursive averaging filter to reduce the variance of the noise level estimate. In one embodiment, the smoothed noise level estimate is split into five different noise modes: very-low, low, medium, high and very-high noise modes. The noise level may be mapped into five different noise modes by using four noise level thresholds. In order to avoid frequent noise mode state transitions, the instantaneous noise mode history from past frames may be used to derive a slow varying noise mode. The discrete noise mode distribution may be updated every frame based on instantaneous noise mode values from current and past frames. The noise mode that occurred most frequently during a pre-specified time frame may be chosen as the current noise mode.

The ambient noise floor block 633 may track the minimum noise level over a long period, which is provided to system control block 662 as spatial statistic ambientNoiseFloor, without using an explicit near-field speech activity detector. The noise floor on the far microphone 604 may be used to reduce bias introduced by the presence of near-field speech.

The speech reference block 634 examines the near microphone signal and the far microphone signal to provide the system control block 662 with a multi-level discretized long-term signal to noise ratio statistic, snrMode. The noiseMode statistic may provide a good indication regarding the ambient noise level on a long-term basis. However, it may fail to provide information regarding the near-field speech level. Given a background noise condition, the SNR may vary significantly depending on the loudness level of the user's speech. Hence, it is preferable to estimate the long-term SNR for a prevailing background noise condition and use the estimate to dynamically adjust various algorithmic parameters. For example, the long-term SNR in conjunction with the noise mode (noiseMode) may be used to determine if the user is a loud or quiet talker. The long-term SNR may be estimated by first smoothing the gated long-term ISNR provided by the ISRN block 636. The instantaneous long-term SNR may be calculated by taking the inverse of the long-term ISNR. The continuous valued long-term SNR estimate may be transformed to a discrete level SNR mode with three states: low, medium, and high. The instantaneous snrMode statistic may be obtained by quantizing the continuous SNR estimate using two thresholds. Similar to the noiseMode, the instantaneous SNR modes from past frames are used to derive a slow-varying discrete SNR mode. The speech reference block 634 also computes the speech reference signal that is provided to the ISNR block 636 and that is an estimate of the level of desired speech.

The ISNR block 636 provides the system control block 662 with the ISNR statistic that may be used to provide a probability of a near-field signal arriving from a pre-specified direction. In one embodiment, the ISNR block 636 computes the ratio of the energy of the noise reference signal (e.g., output of noise reference block 614) to the energy of the speech reference signal output of the speech reference block 634. The ILD statistic may fail to detect the presence of near-field speech in high noise conditions and also when the near microphone 602 moves away from the mouth. In a typical headset application and for a given microphone array configuration, the range of near-field signal arrival direction may be determined a priori by considering all possible use cases. Given the a priori near-field signal arrival direction range information, one may estimate the ISNR which may then be used as a robust statistic to estimate the probability of near-field speech presence, which may affect control signals generated by the system control block 662, e.g., spatialFiltAdaptEn. The ISNR spatial statistic may be derived by using a set of nullformers. A noise direction far-field nullformer may be formed to capture most of the speech arriving from the speech acceptance direction while suppressing interfering noise arriving from all other directions. Similarly, a near-field speech nullformer may be formed to capture far-field noise while suppressing near-field signals arriving from the speech acceptance direction. In order to attenuate the near-field speech, a near-field nullformer may be required to take into account the near-field effects. The near-field processing may be achieved either through gain calibration that tracks the propagation loss or through frequency response equalization that accounts for diffraction effects. The null direction for the two nullformers may be dynamically tracked using controls from the decision logic of the system control block 662. The instantaneous spatial ISNR may be calculated as a ratio of a smoothed output energy of the noise beamformer and a smoothed output energy of the speech beamformer. The result may be further smoothed using a slow-attach/fast-decay approach. The near-field signal detection performance may be enhanced by employing a dynamic threshold adjustment scheme that accounts for variations due to noise level and noise arrival direction.

The spatial filter 608 combines the near microphone 602 and far microphone 604 signals to reduce the background noise. As described above, conventional beamforming methods that combine two microphones to form a virtual signal acquisition beam focused towards a desired direction such that signals arriving from directions other than the focused direction will be attenuated may be ineffective for widely spaced microphone arrays and in particular at higher frequencies due to a spatial aliasing effect. Advantageously, embodiments are described in which the near microphone 602 may be used as a voice microphone and the spatial filter 608 may be used to reduce the noise in the near microphone. In one embodiment, the spatial filter 608 filters the noise reference signal and then subtracts the filtered noise reference signal from the calibrated near microphone signal. In one embodiment, the adaptive spatial filter 608 updates its filter coefficients only when directed to by the control system 662 via the spatialFiltAdaptEn control signal, e.g., when the desired speech is not present, which may be indicated by the ISNR statistic, for example. In an alternate embodiment, the far microphone signal is provided to the spatial filter 608 for subtraction from the near microphone signal. In order to prevent adaptation of filter coefficients to uncorrelated electrical noise, the adaptation may be enabled only when appreciable acoustic noise is present in the background. The adaptation may also be enabled whenever speech is not detected irrespective of other conditions, which may allow far-field noise reduction even when the interfering noise signal is arriving from the speech acceptance direction.

The wind control block 652 receives the near microphone signal, the far microphone signal and the combined output signal of the spatial filter 608 and selects one of them as an output signal for provision to the time-to-frequency block 654. The combined output signal of the spatial filter 608 is a combination of the near microphone signal and the far microphone signal according to operation of the noise reference block 614 and spatial filter 608 as described above. The combined output signal of the spatial filter 608 comprises a near-field speech signal component and a residual background noise signal component. The residual background noise signal is the noise present after the near and far microphone signals are combined into a single stream of data. The wind control block 652 makes its selection based on the windPresent and the windPresentMicNum control signals.

The high energy signals induced by air flow across the microphones create a signal processing challenge since the wind to signal noise ratio is generally very high and it is difficult to separate speech signals from the wind signal. However, given the wide microphone spacing, the spatial diversity may be exploited to appropriately handle the wind noise to mitigate its effects. For example, in the side pendant configuration, if the wind is blowing from the rear side, the far microphone 604 contains significant wind noise, whereas the wind noise level in the near microphone 602 is minimal due to the obstruction of wind by torso of the user. Therefore, the wind control block 652 may select the best signal from all possible microphone combinations: near microphone, far microphone, or the output of the spatial filter 608 based on the prevailing wind condition.

Figure 7:
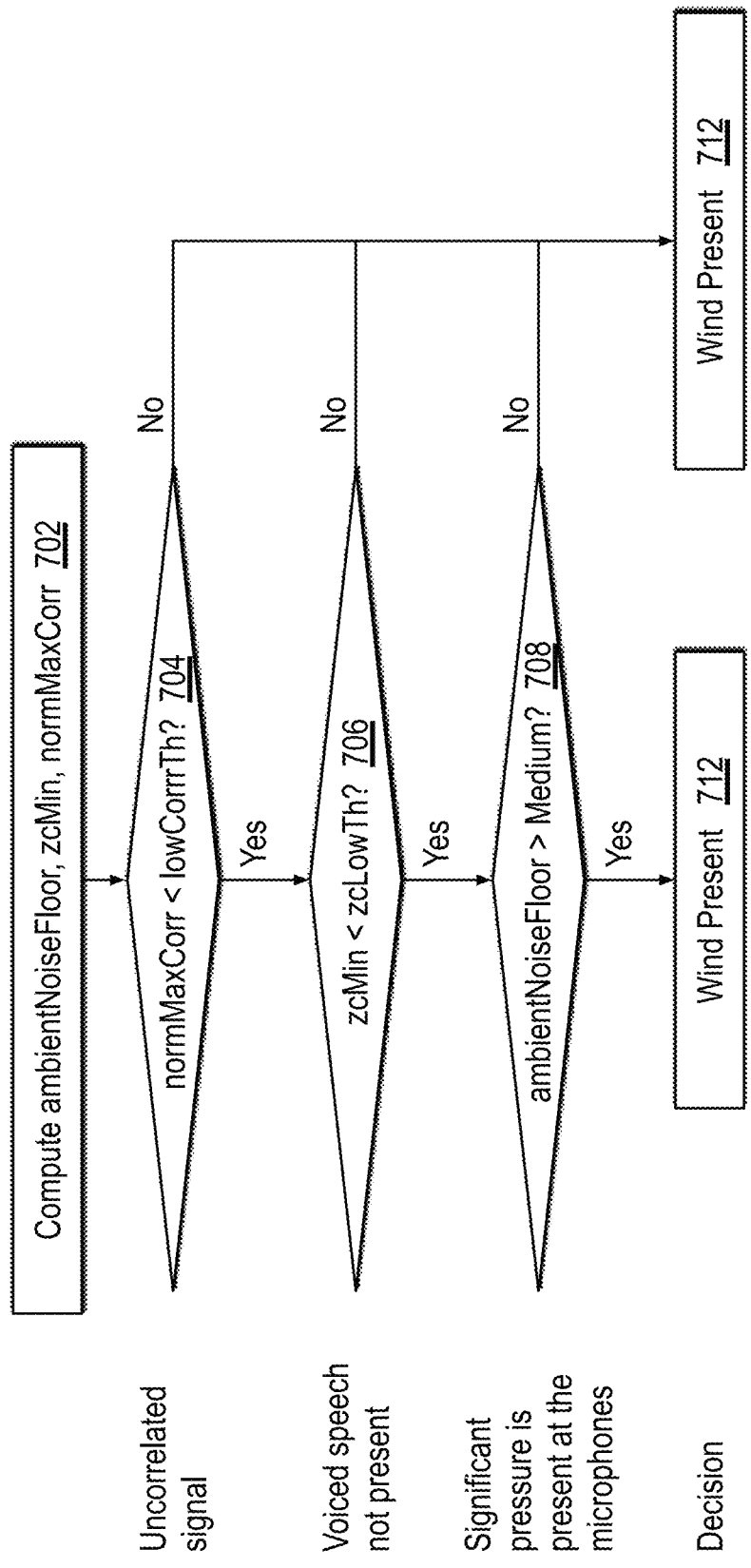
FIG. 7 is a flowchart illustrating operation of the system of FIG. 6 to detect wind noise in accordance with embodiments of the present disclosure.

In order to select the appropriate signal, the presence of wind noise must be detected first. Since wind travels at a different velocity than sound and the air turbulence is sensitive to differences in mechanical and physical obstructions, the wind noise in microphone signals are highly uncorrelated in the cross-correlation lag range used in acoustic signal processing embodiments. Moreover, wind noise contains high energy low frequency signal content, which may be captured through the zero-crossing rate of the microphone signal samples. Therefore, the normalized maximum cross-correlation (normMaxCorr) and the zero-crossing rate (zcMin and zcMax) spatial features may be used by the system control block 662 to detect the presence of wind noise. FIG. 7, described in more detail below, illustrates operation of the system 600 according to one embodiment to detect wind noise.

In one embodiment, the output of the spatial filter 608 is selected if wind is not present or wind is present in both microphones. Since the noise reference signal for the spatial filter 608 may be derived under a near-field assumption, the wind noise in the noise reference signal may be correlated with the wind noise in the near microphone signal; hence, the output of spatial filter 608 is selected when the wind noise level is similar in both microphones. Once wind noise is detected, the ILD spatial feature may be used to select the appropriate microphone signal. If the ILD is higher than a first predetermined threshold (e.g., wind coming from the rear), then the near microphone signal may be selected, whereas if the ILD is lower than a second predetermined threshold (e.g., wind coming from the other side of the pendant), then the far microphone signal may be selected.

The time-to-frequency block 654 receives the output signal selected by the wind control block 652 and transforms it to the frequency domain to enable the noise reduction block 656 to reduce noise using an augmented spectral subtraction technique based on an estimate of residual noise in the selected output signal made by the background noise reduction block 658, all under the control of the system control block 662, e.g., via the desiredSigNotPresent, windPresent and noiseAdaptRate control signals, as will now be described.

Assume s[n] is the clean speech sample corrupted by an additive and uncorrelated noise sample n[n], then the noisy speech sample x[n] is the sum of s[n] and n[n]. Since x[n] and n[n] are uncorrelated, the discrete power spectrum of the noisy speech $P_x[k]$ is the sum of $P_s[k]$ and $P_n[k]$, where $P_s[k]$ is the discrete power spectrum of the speech and $P_n[k]$ is the discrete power spectrum of the noise. If the discrete power spectral density (PSD) of the noise source is completely known, it may be subtracted from the noisy speech signal to produce clean speech, and the frequency response H[k] may be written as $$H[k] = \sqrt{\frac{P_x[k] - P_n[k]}{P_x[k]}}.$$

When the noise source is not known, the power spectral density of the noise may be estimated. For a single microphone noise reduction solution, the noise is estimated from the noisy speech, which is the only available signal. The noise estimated from noisy speech is not accurate. Therefore, an adjustment to the subtraction rule is made to reduce the speech distortion resulting from inaccurate noise estimates by introducing a parameter that controls the spectral weighting factor, such that frequencies with low SNR are attenuated and frequencies with high SNR are not modified. The weighting filter may be modified as $$H[k] = \sqrt{\frac{P_x[k] - \beta \hat{P}_n[k]}{P_x[k]}}.$$

where $\hat{P}n[k]$ is the power spectrum of the noise estimate, and $\beta$ is the parameter that controls the spectral weighting factor based on the sub-band SNR. Finally, the clean speech estimate Y[k] is obtained by applying the weighting filter H[k] to the Fourier transform of the noisy speech signal X[k], $$Y[k]=X[k]H[k].$$

The spatial features described herein may be used to augment single channel noise reduction algorithms similar to the one described above. The spatial controls provide the likelihood of desired speech presence, which may be used to update the background noise estimate whenever a noise-only presence likelihood condition is detected. Similarly, the background noise estimation may be frozen if there is a high likelihood of desired speech presence. In an alternate embodiment, a multiple-state discrete signaling approach is employed to obtain additional benefits from the spatial controls by accounting for noise level fluctuations. Specifically, a modified Doblinger noise estimate described in U.S. Pat. No. 7,492,889, which is hereby incorporated by reference in its entirety for all purposes, may be augmented with the spatial controls. The modified Doblinger noise estimate equation is given by $$\hat{P}_n[m, k] = \begin{cases} P_x[m, k], & P_x[m, k] \leq \hat{P}_n[m, k] \\ \delta_{pn}\hat{P}_n[m-1, k] + (1 - \delta_{pn})P_x[m, k], & \text{otherwise} \end{cases}$$

where $\hat{P}_n[m, k]$ is the noise spectral density estimate at spectral bin k, $P_x[m, k]$ is the power spectral density of noisy signal and $\delta_{pn}$ is the noise update rate (e.g., noiseAdaptRate) that controls the rate at which the background noise is estimated. The minimum statistic condition in the above update equation makes the noise estimate under-biased at all times. The under-biased noise estimate may introduce musical artifacts during the noise reduction process. An embodiment for using the spatial features to control the update rate of the recursive averaging filter to reduce the effects of under-biased noise estimation will now be described.

The noise adaptation rate for the spectral noise reduction may be a critical parameter to effectively suppress non-stationary noises. Moreover, it may be necessary to employ aggressive noise reduction for non-stationary interference signals to bring the residual noise level below the hearing threshold. The spatial controls aid in accurate estimation of background noise through dynamic modification of the noise adaptation rate parameter (e.g., noiseAdaptRate) as a function of prevailing signal and noise conditions. In one embodiment, a first level of logic checks for the presence of desired near-field speech (e.g., by comparing the various spatial features, e.g., normMaxCorr, DOA, ISNR, ILD, ILD_HPF, to adapted thresholds) and sets the background noise estimation and the noise reduction in a conservative mode in order to preserve speech quality. A second level decides if interfering noise alone is present and appropriately adjusts the noise reduction parameters. The second control may be divided further into two paths: aggressive and moderately aggressive noise reduction controls.

As stated above, the dynamic threshold calculation block 664 may dynamically adjust the thresholds, e.g., in response to changes in the levels of background noise and desired speech. For example, the ISNR statistic may exhibit a wider dynamic range as a function of noise level. In order to avoid speech suppression, the ISNR thresholds may be set at values that are matched for worst case noise level scenarios. Such a fixed thresholding approach may result in reduced noise rejection when the actual noise level is less than the worst-case condition. The noise rejection performance may be improved by employing a dynamic thresholding scheme in which thresholds are adjusted as a function of noise level.

Referring now to FIG. 7, a flowchart illustrating operation of the system 600 of FIG. 6 to detect wind noise in accordance with embodiments of the present disclosure is shown. Operation begins at block 702.

At block 702, the ambientNoiseFloor, zcMin and normMaxCorr are computed, e.g., by ambient noise floor block 633, zero-crossing block 626, and maximum correlation block 644, respectively, of FIG. 6. The operation proceeds to decision block 704.

At decision block 704, the normMaxCorr is compared with a predetermined lower correlation threshold value, lowCorrTh, to determine whether the microphone signals are uncorrelated. If normMaxCorr is less than lowCorrTh, the operation proceeds to decision block 706; otherwise, a determination is made at block 714 that wind is not present.

At decision block 706, the zcMin is compared with a predetermined lower zero-crossing threshold value, zcLowTh, to determine whether voiced speech is not present. If zcMin is less than zcLowTh, the operation proceeds to decision block 708; otherwise, a determination is made at block 714 that wind is not present.

At decision block 708, the ambientNoiseFloor is compared with a predetermined medium threshold value, Medium, to determine whether significant pressure is present at both microphones. If ambientNoiseFloor is less than Medium, the operation proceeds to block 712 where a determination is made that wind is present; otherwise, a determination is made at block 714 that wind is not present.

Figure 8:
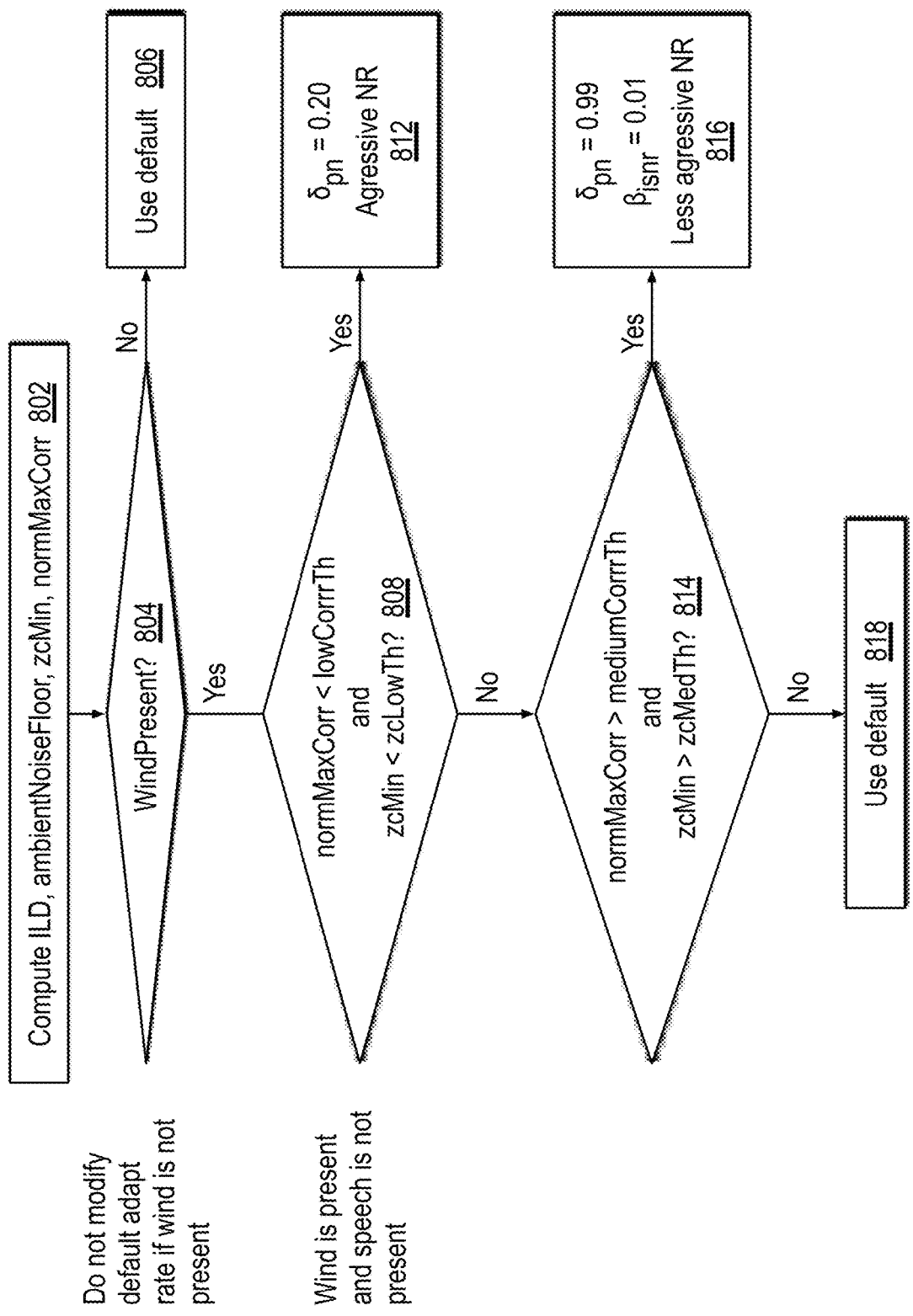
FIG. 8 is a flowchart illustrating operation of the system of FIG. 6 to control wind noise suppression in accordance with embodiments of the present disclosure.

Referring now to FIG. 8, a flowchart illustrating operation of the system 600 of FIG. 6 to control wind noise suppression in accordance with embodiments of the present disclosure is shown. Operation begins at block 802.

At block 802, the ILD, ambientNoiseFloor, zcMin and normMaxCorr are computed, e.g., by ambient noise floor block 633, zero-crossing block 626, and maximum correlation block 644, respectively, of FIG. 6. The operation proceeds to decision block 804.

At decision block 804, if wind is present (e.g., control signal windPresent is true), the operation proceeds to decision block 808; otherwise, the default adapt rate is maintained (e.g., value of control signal noiseAdaptRate) at block 806.

At decision block 808, the normMaxCorr is compared with lowCorrTh and the zcMin is compared with zcLowTh to determine whether wind is present and speech is not present. If so, an aggressive noise reduction approach is taken at block 812 (e.g., noiseAdaptRate of 0.20); otherwise, the operation proceeds to decision block 814.

At decision block 814, the normMaxCorr is compared to see if it is greater than a predetermined medium correlation threshold, mediumCorrTh, and the zcMin is compared to see if it is greater than a predetermined medium zero-crossing threshold, zcMedTh, and if both are true, a less aggressive noise reduction approach is taken at block 816 (e.g., $\delta_{pn}$, or noiseAdaptRate, of 0.99 and a sub-band SNR spectral weighting factor control parameter ($\beta$) of 0.01); otherwise, the default adapt rate is maintained at block 818.

Generally speaking, when wind is blowing from the front, the wind noise level is similar between the microphones and the best signal selection logic may have limited benefit. Hence, it may be beneficial to reduce the noise by controlling the estimation of the background wind noise spectrum. Since wind noise is non-stationary, the background noise is estimated in a quick manner, whenever it is determined that near-field speech is not present. The normMaxCorr statistic is not very low when near-field speech is present and the minimum of the zero-crossing rate between the microphones is also higher. When speech is detected in the presence of wind noise, the noise reduction parameters are set at moderately aggressive mode and when speech is absent, then the noise reduction is set in aggressive mode.

Referring now to FIG. 9, a flowchart illustrating operation of a noise reduction system (e.g., system 600 of FIG. 6) to reduce noise in accordance with embodiments of the present disclosure is shown. Operation begins at block 902.

At block 902, a multi-dimensional spatial feature vector is obtained based on the signals of an array of microphones (e.g., near microphone 602 and far microphone 604 of FIG. 6). The spatial features of the feature vector may include a normalized maximum correlation of the array microphone signals that may be used to determine a presence of directional near-field speech; a ratio of energies of the microphone signals, or inter-microphone level difference, that may be used to determine a proximity of the microphone of the array closest to the user's mouth; an estimate of the direction of arrival of near-field speech; a ratio of high-pass filtered energies of the microphone signals that may be used to determine the presence of un-voiced speech; an inverse signal-to-noise ratio of the near-field speech that may be used to indicate a probability of near-field speech arriving from a pre-specified direction; zero-crossing rates of the microphones that may be used to indicate the presence of wind in the background noise; a long-term average level of background noise; a multi-level discretized long-term background noise level; a multi-level discretized long-term signal-to-noise ratio of the near-field speech (e.g., respectively, normMaxCorr, ILD, DOA, ILD_HPF, ISNR, zcMin/zcMax, ambientNoiseFloor, noiseMode, snrMode of FIG. 6). The spatial feature vector is continuously obtained as the system operates and is used to generate control signals (e.g., noiseRefAdaptEn, mcSpeechAdaptEn, mcNoiseAdaptEn, spatialFiltAdaptEn, desiredSigNotPresent, windPresent, desiredSigDOA, noiseAdaptRate, windPresentMicNum by system control block 662 of FIG. 6). The operation proceeds to block 904.

At block 904, an estimate of the near-field speech energy (e.g., snrMode output of speech reference block 634) is made and an estimate of the background noise energy (e.g., noise reference signal output of noise reference block 614) is made using the spatial feature vector (e.g., noiseRefAdaptEn and desiredSigDOA). The operation proceeds to block 906.

At block 906, an estimate of the probability of a presence of near-field speech using the ratio of the near-field speech energy estimate and the background noise energy estimate (e.g., ISNR) is made. The operation proceeds to block 908.

At block 908, the microphone signals are adaptively combined (e.g., by adaptive spatial filter 608) based on the near-field speech presence probability estimate (e.g., controlled by spatialFiltAdaptEn which is derived from the spatial features, e.g., ISNR) to provide a combined output signal (e.g., output of spatial filter 608 or wind control block 652) that has a near-field speech component and a residual background noise component. The operation proceeds to block 912.

At block 912, an estimate is made of the power spectral density of the residual background noise signal present in the combined output signal (e.g., output of background noise estimation block 658) using the near-speech presence probability estimate. In one embodiment, the power spectral density estimate is made adaptively when the background noise energy and/or near-field speech energy changes. The operation proceeds to block 914.

At block 914, the background noise in the combined output signal is reduced using the power spectral density estimate (e.g., by noise reduction block 656 based on the desiredSigNotPresent control signal). In one embodiment, the background noise in the combined output signal is reduced by calculating a time-frequency dependent gain function based on the power spectral density of the residual background noise signal and applying the calculated gain on the combined output signal.

Referring now to FIG. 10, a flowchart illustrating operation of a noise reduction system (e.g., system 600 of FIG. 6) to reduce noise in accordance with embodiments of the present disclosure is shown. The operation described in FIG. 10 is to be understood in conjunction with the operation described in FIG. 9. Operation begins at block 1002.

At block 1002, a determination is made whether the background noise includes wind (e.g., windPresent based on zero-crossing rates zcMin/zcMax). The operation proceeds to block 1004.

At block 1004, an output signal is selected, based on wind energy diversity among the microphones, from one of the following: the combined output signal of the spatial filter 608 and one of the microphone signals (e.g., the microphone signal with the least amount of wind noise energy), e.g., according to operation of the wind control block 652. The microphone with the greatest amount of wind noise may be indicated by the windPresentMicNum spatial feature. In an alternate embodiment, the system control block 662 generates a control signal that indicates the microphone with the least amount of wind noise. The operation proceeds to block 1006.

At block 1006, an estimate is made of the power spectral density of the wind noise signal present in the output signal selected at block 1004 (e.g., output of background noise estimation block 658). In one embodiment, the power spectral density estimate is made on the wind power using the multi-dimensional spatial feature vector. The operation proceeds to block 1008.

At block 1008, the wind noise in the selected output signal is reduced using the power spectral density estimate made at block 1006 (e.g., by noise reduction block 656 based on the desiredSigNotPresent control signal). In one embodiment, the wind noise in the selected output signal is reduced by calculating a time-frequency dependent gain function based on the power spectral density of the wind noise and applying the calculated gain on the selected microphone signal.

Figure 11:
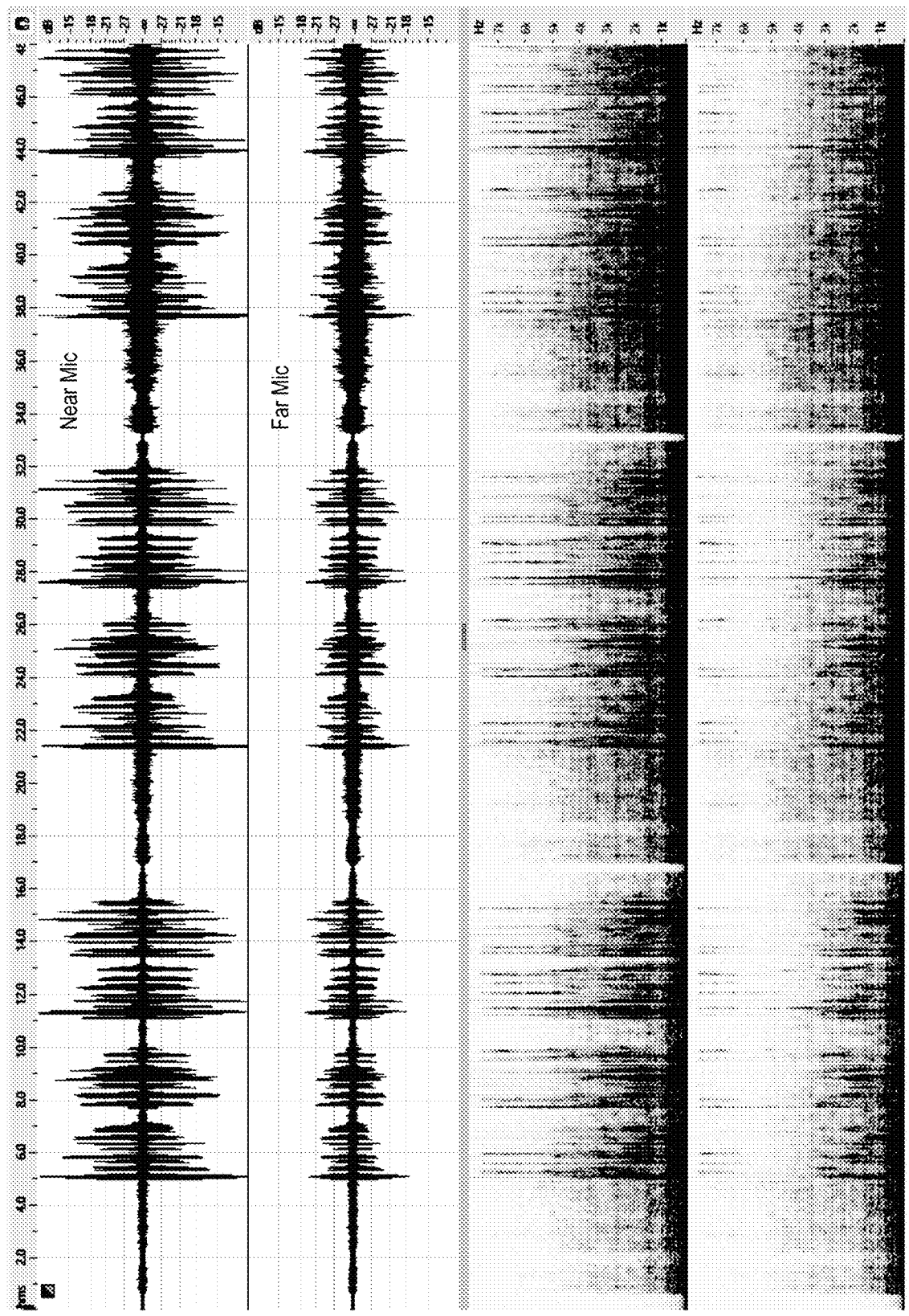
FIG. 11 is two graphs of a noisy speech signal of a near microphone and a far microphone, respectively, in a side pendant configuration and corresponding spectrograms.
Figure 12:
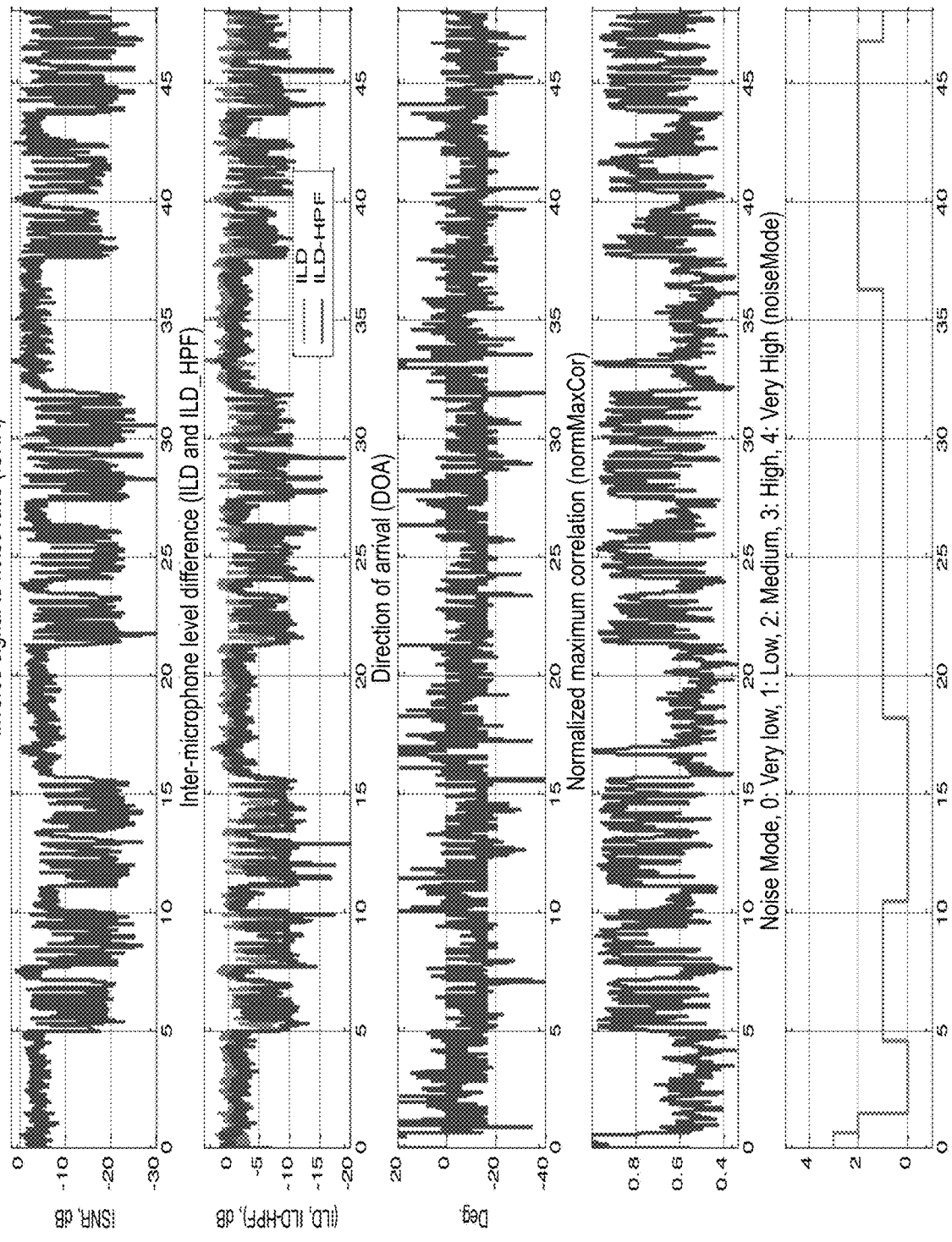
FIG. 12 is five graphs showing spatial features derived from the microphone signals of FIG. 11.
Figure 13:
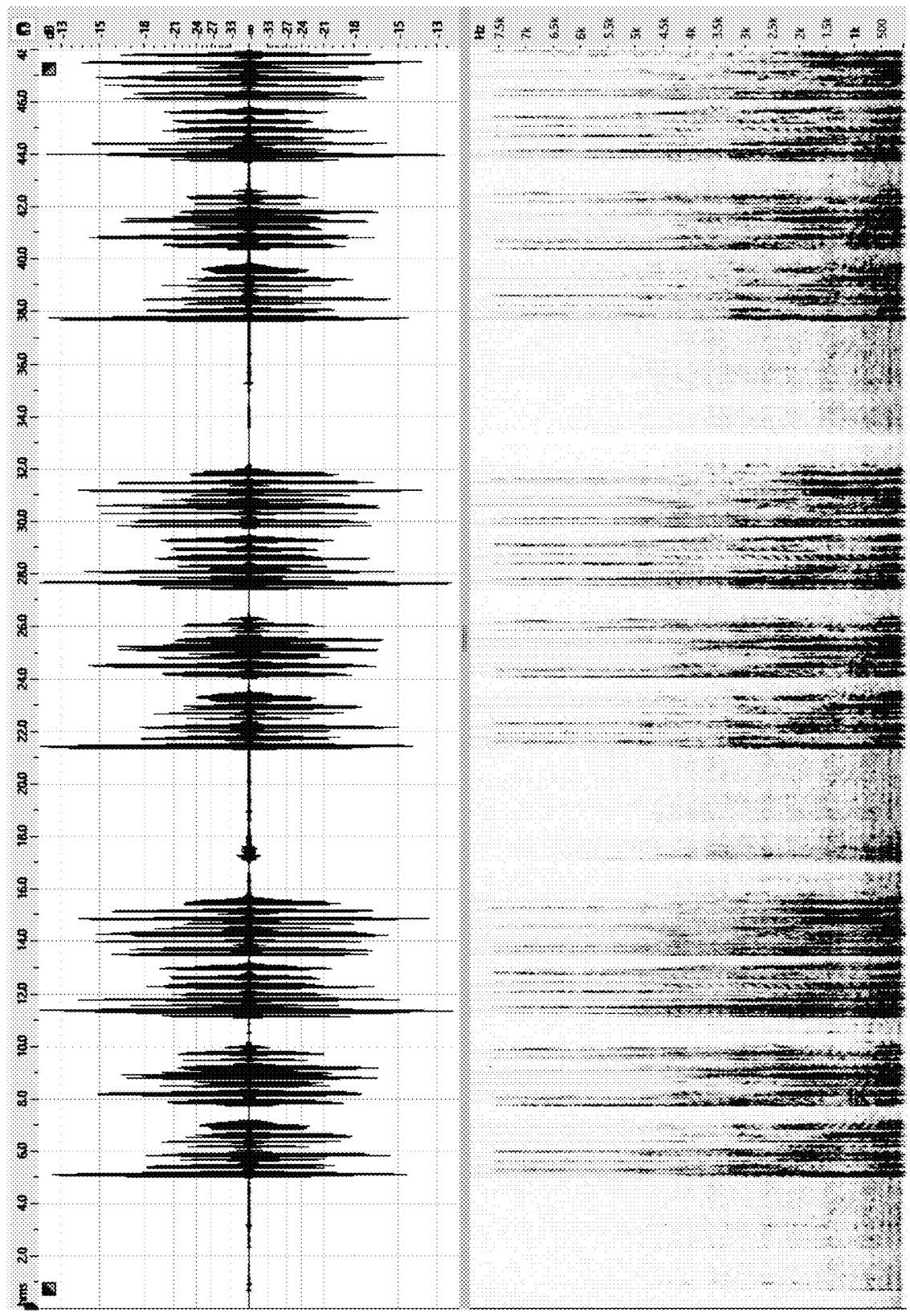
FIG. 13 is a graph showing the output processed by a noise reduction method in a multi-microphone audio device using a multi-dimensional spatial feature vector and a corresponding spectrogram.

FIGS. 11, 12 and 13 will now be described together. FIG. 11 is two graphs of a noisy speech signal of a near microphone (e.g., near microphone 602) and a far microphone (e.g., far microphone 604), respectively, in a side pendant configuration (e.g., of FIG. 3) and corresponding spectrograms. The microphone signals are recorded in a babble noise condition simulated at three different noise levels. During the interval from approximately 0 to 17, the noise level is low; from approximately 17 to 33, the noise level is moderate; and from approximately 33 to 48, the noise level is highest. FIG. 12 shows corresponding spatial features derived from the microphone signals. FIG. 13 is a graph showing the output processed by a noise reduction method in a multi-microphone audio device using a multi-dimensional spatial feature vector (e.g., embodiments described with respect to system 600) and a corresponding spectrogram. As seen from FIGS. 11 through 13, the noise reduction method reduces the non-stationary noise while preserving the desired speech with good intelligibility.

The noisy speech signals of FIG. 11 and the corresponding output levels of FIG. 13 are observed for almost 50 milliseconds and are measured in dB. The corresponding spectrograms are observed over the same duration and range in frequency from zero to approximately 8 kHz, and the power spectral density (PSD) at each frequency is indicated proportional to pixel darkness intensity. The spatial features of FIG. 12 are also observed over the same duration. The ISNR, ILD and ILD_HPF are measured in dB, the DOA is measured in degrees, and the normMaxCorr and noiseMode are unitless. In FIG. 12, the darker graph indicates the ILD_HPF, whereas the lighter graph indicates the ILD, as shown.

As may be observed from FIG. 11, the levels of the speech signal are generally greater in the near microphone than in the far microphone, e.g., because the speaker's mouth is closer to the near microphone. As may be observed in FIG. 11, during the intervals from approximately 0 to 5, 16 to 21, and 32 to 37.5, there is no speech and only background noise. As shown in FIG. 12, the ILD and ILD_HPF are approximately zero during the intervals of no speech, indicating the background noise is far-field noise since there is little propagation loss difference between the two microphones. In contrast, the ILD and ILD_HPF indicate a significant difference between the near and far microphone levels in the intervening intervals where there is a significant of near-speech.

During the noise-only intervals, the noise is coming from farther away than the near-speech intervals when the signal is coming from closer to the mouth. As may be observed in FIG. 12, the DOA indicates that the sound is coming from a different direction during the two interval categories. The DOA estimates concentrated around 0° correspond to far-field noise arriving from a broadside direction, and the DOA estimates concentrated around −20° correspond to desired speech arriving from −20°. In this particular example, the discrimination ability of DOA statistic is minimal. This is only one instance for the need for a multi-dimensional feature set to make sure majority of signal conditions are appropriately covered by the present method. As may also be observed in FIG. 12, the ISNR is low during the noise-only intervals and is high when speech is present. Under some conditions, the discrimination ability of the ISNR statistic may be better than the ILD statistics. More specifically, as seen from FIG. 12, the dynamic range of the ISNR is greater than the ILD statistics, which may aid in detecting the desired speech signal at low SNR conditions. Furthermore, during the near-speech intervals, the signal is coming from close to the microphone array, and the signals in the two microphones are highly correlated, i.e., the normMaxCorr is high, because there is not much reflection and the signal is generated from near field. In contrast, during the noise-only intervals, the noise is coming from further away from the microphone array, and the correlation between the two microphones is significantly lower. Thus, the normMaxCorr spatial statistic may be used to determine the presence or absence of speech. FIG. 12 also shows the noiseMode that demonstrates the tracking ability of the system 600 as the prevailing background noise level changes.

Figure 14:
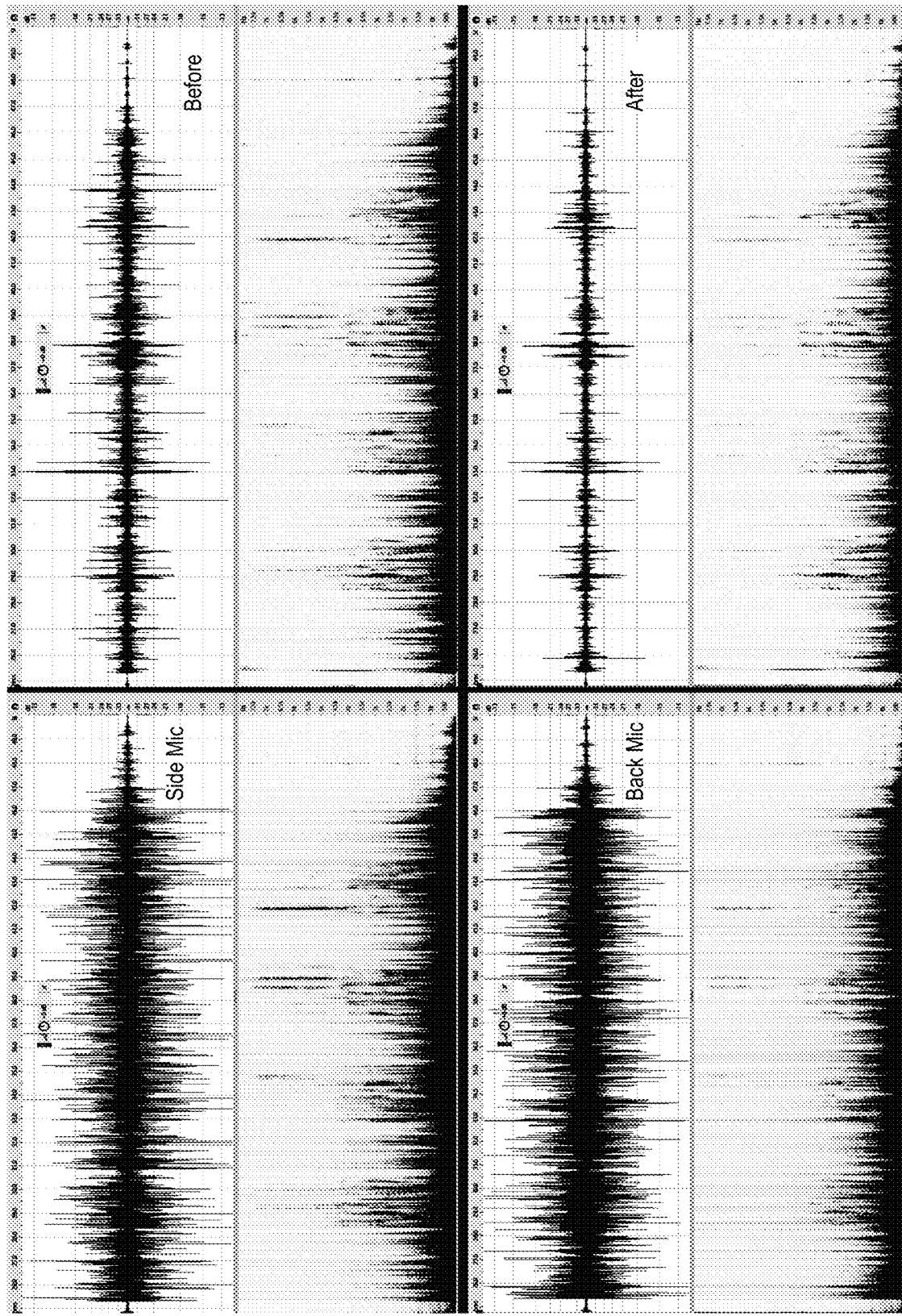
FIG. 14 is four graphs and corresponding spectrograms in a condition in which wind is coming from the front of the user.

Referring now to FIG. 14, four graphs and corresponding spectrograms in a condition in which wind is coming from the front of the user are shown. The upper-left graph/spectrogram illustrate a side microphone signal; the lower-left graph/spectrogram illustrate a back microphone signal; the upper-right graph/spectrogram illustrate the output signal (e.g., output of noise reduction block 656) when the wind control block 652 is not employed; the lower-right graph/spectrogram illustrate the output signal when the wind control block 652 is employed. As may be observed from FIG. 14, the residual wind noise in the output signal is lower when the wind control block 652 is employed.

Figure 15:
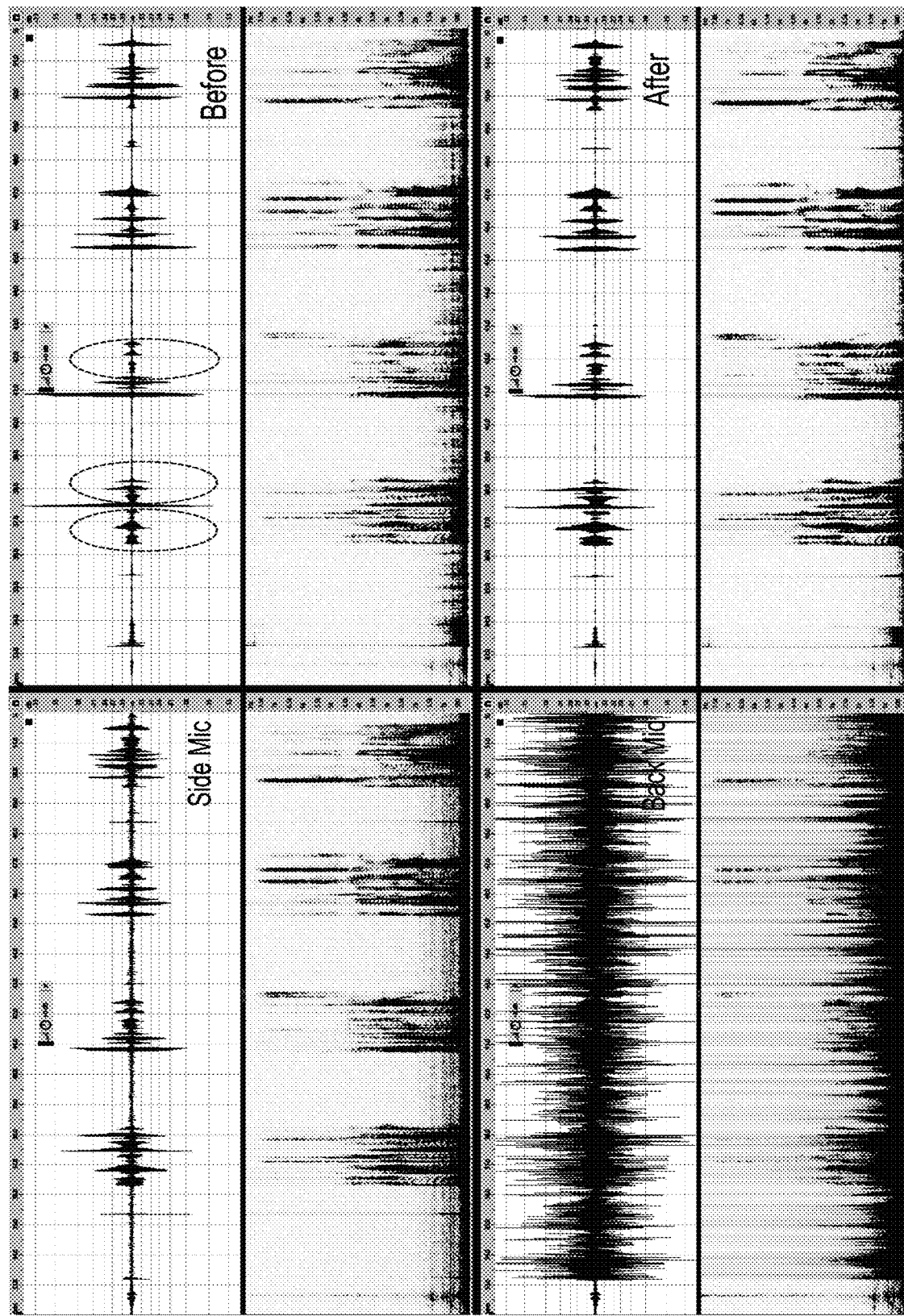
FIG. 15 is four graphs and corresponding spectrograms in a condition in which wind is coming from the back of the user.

Referring now to FIG. 15, four graphs and corresponding spectrograms in a condition in which wind is coming from the back of the user are shown. The upper-left graph/spectrogram illustrate a side microphone signal; the lower-left graph/spectrogram illustrate a back microphone signal; the upper-right graph/spectrogram illustrate the output signal (e.g., output of noise reduction block 656) when the wind control block 652 is not employed; the lower-right graph/spectrogram illustrate the output signal when the wind control block 652 is employed. The combination of two microphones results in speech suppression as indicated by dotted oval shaped markers in FIG. 15. Specifically, the side (near) microphone has very little wind noise and the back (far) microphone has a significant amount of wind noise. If the two signals are combined, the wind noise from the far microphone may bleed into the processed signal at the spatial filter 608. The processed output of the spatial filter 608 may have more wind noise than the near microphone. The noisy signal out of the spatial filter 608 leads to speech suppression performed by the ensuing frequency domain residual noise reduction block 656. However, when the wind control block 652 is employed, large differences in wind noise levels are detected and the microphone that contains the least amount of wind noise is selected.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method of voice processing for an audio device with an array of at least two microphones with dynamically changing array orientation to reduce background noise, comprising:
   obtaining a multi-dimensional spatial feature vector comprising at least a correlation of the at least two microphones and a calculation of at least one ratio of energies of the at least two microphones;
   using the multi-dimensional feature vector to estimate an energy of near-field speech and to estimate an energy of background noise;
   using a ratio of the near-field speech energy estimate and the background noise energy estimate to estimate a probability of a presence of the near-field speech;
   adaptively combining signals from the at least two microphones based on the estimated near-field speech presence probability to provide a combined output signal comprising a near-field speech signal and a residual background noise signal;
   estimating a power spectral density of the residual background noise signal present at the combined output signal using the estimated near-field speech presence probability; and
   reducing the background noise by using the estimated power spectral density.

2. The method of claim 1, wherein said reducing the background noise comprises calculating a time-frequency dependent gain function based on the estimated residual background noise power spectral density and applying the calculated gain on the combined output signal to reduce the background noise.

3. The method of claim 1, further comprising:
adaptively controlling said estimating the power spectral density of the residual background noise signal when at least one of the following varies: the background noise energy and the near-field speech energy.

4. The method of claim 3, wherein a level of the background noise is discretized as N-state noise level modes and M-state SNR modes, wherein N and M are integers greater than one.

5. The method of claim 4, further comprising:
dynamically modifying thresholds as a function of prevailing conditions of the background noise level and SNR; and
comparing the spatial features of the multi-dimensional feature vector with the dynamically modified thresholds to generate control signals.

6. The method of claim 1, further comprising:
determining that the background noise comprises wind noise;
selecting as an output signal one of the following based on diversity of energy of the wind noise among the at least two microphones:
the combined output signal; and
the signal from one of the at least two microphones;
estimating a power spectral density of the wind noise present at the selected output signal; and
reducing the wind noise by using the estimated power spectral density of the wind noise.

7. The method of claim 6, wherein the power spectral density of the wind noise is estimated using the multi-dimensional spatial feature vector.

8. The method of claim 7, wherein the power spectral density of the wind noise is estimated differently depending on whether acoustic noise or wind noise is present.

9. The method of claim 1, wherein the array of at least two microphones are spaced at least 100 millimeters apart.

10. The method of claim 1, wherein the multi-dimensional spatial feature vector further comprises one or more spatial features from the list:
an estimate of direction of arrival of the near-field speech;
a calculation of a ratio of high pass-filtered energies of the at least two microphone signals;
an inverse signal-to-noise ratio of the near-field speech signal;
a zero-crossing rate of the at least two microphone signals;
a long-term average level of the background noise;
a multi-level discretized long-term background noise level; and
a multi-level discretized long-term signal-to-noise ratio of the near-field speech signal.

11. The method of claim 1, further comprising:
calculating a ratio of high pass-filtered energies of the at least two microphone signals; and
detecting a presence of unvoiced speech using the calculation of the ratio of the high pass-filtered energies of the at least two microphone signals.

12. The method of claim 1, further comprising:
using the estimated near-field speech presence probability to dynamically control an aggressiveness of said reducing the background noise by using the estimated power spectral density.

13. An audio device, comprising:
an array of at least two microphones;
a voice processing system, configured to:
obtain a multi-dimensional spatial feature vector comprising at least a correlation of the at least two microphones and a calculation of at least one ratio of energies of the at least two microphones;
use the multi-dimensional feature vector to estimate an energy of near-field speech and to estimate an energy of background noise;
use a ratio of the near-field speech energy estimate and the background noise energy estimate to estimate a probability of a presence of the near-field speech;
adaptively combine signals from the at least two microphones based on the estimated near-field speech presence probability to provide a combined output signal comprising a near-field speech signal and a residual background noise signal;
estimate a power spectral density of the residual background noise signal present at the combined output signal using the estimated near-field speech presence probability; and
reduce the background noise by using the estimated power spectral density.

14. The audio device of claim 13, wherein to reduce the background noise, the voice processing system is configured to:
calculate a time-frequency dependent gain function based on the estimated residual background noise power spectral density and apply the calculated gain on the combined output signal to reduce the background noise.

15. The audio device of claim 13, wherein the voice processing system is further configured to:
adaptively control the estimate of the power spectral density of the residual background noise signal when at least one of the following varies: the background noise energy and the near-field speech energy.

16. The audio device of claim 15, wherein a level of the background noise is discretized as N-state noise level modes and M-state SNR modes, wherein N and M are integers greater than one.

17. The audio device of claim 16, wherein the voice processing system is further configured to:
dynamically modify thresholds as a function of prevailing conditions of the background noise level and SNR; and
compare the spatial features of the multi-dimensional feature vector with the dynamically modified thresholds to generate control signals.

18. The audio device of claim 13, wherein the voice processing system is further configured to:
determine that the background noise comprises wind noise;
select as an output signal one of the following based on diversity of energy of the wind noise among the at least two microphones:
the combined output signal; and
the signal from one of the at least two microphones;
estimate a power spectral density of the wind noise present at the selected output signal; and
reduce the wind noise by using the estimated power spectral density of the wind noise.

19. The audio device of claim 18, wherein the power spectral density of the wind noise is estimated using the multi-dimensional spatial feature vector.

20. The audio device of claim 19, wherein the power spectral density of the wind noise is estimated differently depending on whether acoustic noise or wind noise is present.

21. The audio device of claim 13, wherein the array of at least two microphones are spaced at least 100 millimeters apart.

22. The audio device of claim 13, wherein the multi-dimensional spatial feature vector further comprises one or more spatial features from the list:
- an estimate of direction of arrival of the near-field speech;
- a calculation of a ratio of high pass-filtered energies of the at least two microphone signals;
- an inverse signal-to-noise ratio of the near-field speech signal;
- a zero-crossing rate of the at least two microphone signals;
- a long-term average level of the background noise;
- a multi-level discretized long-term background noise level; and
- a multi-level discretized long-term signal-to-noise ratio of the near-field speech signal.

23. The audio device of claim 13, wherein the voice processing system is further configured to:
- calculate a ratio of high pass-filtered energies of the at least two microphone signals; and
- detect a presence of unvoiced speech using the calculation of the ratio of the high pass-filtered energies of the at least two microphone signals.

24. The audio device of claim 13, wherein the voice processing system is further configured to:
- use the estimated near-field speech presence probability to dynamically control an aggressiveness at which the background noise is reduced by using the estimated power spectral density.

25. A non-transitory computer-readable medium having instructions stored thereon that are capable of causing or configuring an audio device having an array of at least two microphones and a voice processing system to perform operations comprising:
- obtaining a multi-dimensional spatial feature vector comprising at least a correlation of the at least two microphones and a calculation of at least one ratio of energies of the at least two microphones;
- using the multi-dimensional feature vector to estimate an energy of near-field speech and to estimate an energy of background noise;
- using a ratio of the near-field speech energy estimate and the background noise energy estimate to estimate a probability of a presence of the near-field speech;
- adaptively combining signals from the at least two microphones based on the estimated near-field speech presence probability to provide a combined output signal comprising a near-field speech signal and a residual background noise signal;
- estimating a power spectral density of the residual background noise signal present at the combined output signal using the estimated near-field speech presence probability; and
- reducing the background noise by using the estimated power spectral density.

26. The non-transitory computer-readable medium of claim 25, wherein said reducing the background noise comprises calculating a time-frequency dependent gain function based on the estimated residual background noise power spectral density and applying the calculated gain on the combined output signal to reduce the background noise.

27. The non-transitory computer-readable medium of claim 25, wherein instructions stored thereon are capable of causing or configuring the audio device to perform further operations comprising:
- adaptively controlling said estimating the power spectral density of the residual background noise signal when at least one of the following varies: the background noise energy and the near-field speech energy.

28. The non-transitory computer-readable medium of claim 25, wherein instructions stored thereon are capable of causing or configuring the audio device to perform further operations comprising:
- determining that the background noise comprises wind noise;
- selecting as an output signal one of the following based on diversity of energy of the wind noise among the at least two microphones:
  - the combined output signal; and
  - the signal from one of the at least two microphones;
- estimating a power spectral density of the wind noise present at the selected output signal; and
- reducing the wind noise by using the estimated power spectral density of the wind noise.

29. The non-transitory computer-readable medium of claim 25, wherein the multi-dimensional spatial feature vector further comprises one or more spatial features from the list:
- an estimate of direction of arrival of the near-field speech;
- a calculation of a ratio of high pass-filtered energies of the at least two microphone signals;
- an inverse signal-to-noise ratio of the near-field speech signal;
- a zero-crossing rate of the at least two microphone signals;
- a long-term average level of the background noise;
- a multi-level discretized long-term background noise level; and
- a multi-level discretized long-term signal-to-noise ratio of the near-field speech signal.

30. The non-transitory computer-readable medium of claim 25, wherein instructions stored thereon are capable of causing or configuring the audio device to perform further operations comprising:
- calculating a ratio of high pass-filtered energies of the at least two microphone signals; and
- detecting a presence of unvoiced speech using the calculation of the ratio of the high pass-filtered energies of the at least two microphone signals.

31. The non-transitory computer-readable medium of claim 25, wherein instructions stored thereon are capable of causing or configuring the audio device to perform further operations comprising:
- using the estimated near-field speech presence probability to dynamically control an aggressiveness of said reducing the background noise by using the estimated power spectral density.

* * * * *

UNITED STATES PATENT AND TRADEMARK OFFICE
CERTIFICATE OF CORRECTION

PATENT NO. : 10,885,907 B2  
APPLICATION NO. : 16/275580  
DATED : January 5, 2021  
INVENTOR(S) : Samuel P. Ebenezer It is certified that error appears in the above-identified patent and that said Letters Patent is hereby corrected as shown below:

In the Specification

In Column 11, Line 35, delete "ISRN block 636." and insert -- ISNR block 636. --, therefor.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*